(12) United States Patent
Kawase

(10) Patent No.: US 9,255,817 B2
(45) Date of Patent: Feb. 9, 2016

(54) ROTATION-ANGLE DETECTION DEVICE, IMAGE PROCESSING APPARATUS, AND ROTATION-ANGLE DETECTION METHOD

(71) Applicant: Tatsuya Kawase, Kanagawa (JP)

(72) Inventor: Tatsuya Kawase, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 77 days.

(21) Appl. No.: 14/279,637

(22) Filed: May 16, 2014

(65) Prior Publication Data

US 2014/0347040 A1    Nov. 27, 2014

(30) Foreign Application Priority Data

May 23, 2013    (JP) .................................. 2013-108540

(51) Int. Cl.
| | |
|---|---|
| G01B 7/00 | (2006.01) |
| G01R 33/022 | (2006.01) |
| G01D 5/14 | (2006.01) |
| G01D 5/244 | (2006.01) |

(52) U.S. Cl.
CPC .............. *G01D 5/145* (2013.01); *G01D 5/2448* (2013.01)

(58) Field of Classification Search
CPC .............................. G01D 5/145; G01D 5/2448
USPC ........................................ 324/207.12, 207.25
See application file for complete search history.

(56) References Cited

U.S. PATENT DOCUMENTS

| | | | |
|---|---|---|---|
| 7,932,692 B2* | 4/2011 | Inokuma ....................... | 318/799 |
| 9,093,936 B2* | 7/2015 | Omata et al. | |
| 2013/0099708 A1 | 4/2013 | Shimizu et al. | |

FOREIGN PATENT DOCUMENTS

| | | |
|---|---|---|
| JP | 2004-325140 | 11/2004 |
| JP | 2013-250084 | 12/2013 |

\* cited by examiner

*Primary Examiner* — Reena Aurora
(74) *Attorney, Agent, or Firm* — Harness, Dickey & Pierce, P.L.C.

(57) ABSTRACT

A rotation-angle detection device includes: an amplitude adjustment unit that performs correction to match amplitude values of multiple detection signals output from multiple rotation detection units to output corrected signals, the rotation detection units changing outputs in accordance with a rotation angle of a rotor and being provided such that the rotation detection units output the detection signals having different phases; a vector generation unit that performs addition and subtraction on two signals out of the corrected signals to generate two vector component signals that are perpendicular to each other; an amplitude correction unit that performs correction to match amplitudes of the two vector component signals to output corrected vector component signals; and a rotation-angle searching unit that searches for the rotation angle of the rotor on basis of a vector that is represented by the two corrected vector component signals to output a detection angle.

10 Claims, 16 Drawing Sheets

ROTATION ANGLE [deg]

FIG.21

| θd [1:0] | | ENCA | ENCB |
|---|---|---|---|
| bit 1 | bit 0 | | |
| 0 | 0 | H | L |
| 0 | 1 | H | H |
| 1 | 0 | L | H |
| 1 | 1 | L | L |

(H: High, L: Low)

ROTATION-ANGLE DETECTION DEVICE, IMAGE PROCESSING APPARATUS, AND ROTATION-ANGLE DETECTION METHOD

CROSS-REFERENCE TO RELATED APPLICATIONS

The present application claims priority to and incorporates by reference the entire contents of Japanese Patent Application No. 2013-108540 filed in Japan on May 23, 2013.

BACKGROUND OF THE INVENTION

1. Field of the Invention

The present invention relates to a rotation-angle detection device, an image processing apparatus, and a rotation-angle detection method.

2. Description of the Related Art

In image processing apparatuses, such as printers, facsimile machines, copiers, scanners, or multifunction peripherals, a driving mechanism is driven by a drive motor so that each of necessary units is driven at a predetermined speed for image processing, such as an image reading operation or image forming operation.

Conventionally, in order to drive and rotate a rotator, such as a drive motor, at an intended speed, a sensor is provided around the rotator so as to output a signal that changes in a sine-wave pattern in accordance with the rotation angle of the rotator, and a rotation-angle detection device detects the rotation angle of the rotator on the basis of the output signal of the sensor. Specifically, a magnetic sensor, such as a Hall element, is used as the sensor, and the rotation-angle detection device detects the rotation angle of the rotator by using a sequential search algorithm on the basis of the signal output from the magnetic sensor.

However, in conventional rotation-angle detection devices that use magnetic sensors, errors occur in the sensor output signals due to the difference between the sensitivities of the magnetic sensors used in the rotation-angle detection device, deviation of the phase angle due to the error in the assembly of the magnetic sensor in the rotator, and deviation of the magnetization of magnets.

Therefore, in highly-accurate detection of the rotation angle of the rotator, a calibration operation needs to be performed to correct sensor output signals during a manufacturing process in order to detect the rotation angle of the rotator with a high accuracy.

A conventional rotation angle sensor is proposed (see Japanese Patent Application Laid-open No. 2004-325140) which includes two magnetic sensors that are provided at a predetermined angle with respect to the rotation central axis of a rotator and that output signals in accordance with the strength of the magnetic field; a magnet that generates the magnetic field of strength corresponds to the rotation of the rotator at the positions where the magnetic sensors are located; and a signal processing circuit that processes the output signals from the two magnetic sensors so as to determine the rotation angle of the rotator, wherein the signal processing circuit includes a storage unit that stores Fourier coefficients that is obtained during Fourier series expansion, with respect to the rotation angle, on the vector that is represented by the output values of the output signals that are measured while the rotator is rotated by a predetermined rotation angle; and a calculation unit that calculates the rotation angle by using the Fourier coefficients stored in the storage unit.

In other words, in this conventional technique, after the rotation-angle detection device is assembled in the rotator, it is connected to an external calibration device and the rotator is rotated to measure the output signal of the magnetic sensor within the angle detection device. Then, the Fourier coefficient obtained during Fourier series expansion of the measured sensor output signal with respect to the rotation angle is stored in the storage unit of the rotation-angle detection device as a correction value during calculation of the rotation angle. The rotation-angle detection device detects the rotation angle by correcting the sensor output signal during a rotation-angle detection operation on the basis of the correction value.

However, the conventional technique described in Japanese Patent Application Laid-open No. 2004-325140 has a problem in that, as the calibration operation is performed after the rotation-angle detection device is assembled, the costs are increased due to a calibration process required after the rotation-angle detection device is assembled.

Thus, there is a need to accurately detect the rotation angle of a rotary shaft at low costs without performing an operation to calibrate output signals after assembly.

SUMMARY OF THE INVENTION

It is an object of the present invention to at least partially solve the problems in the conventional technology.

A rotation-angle detection device includes: an amplitude adjustment unit that performs correction to match amplitude values of multiple detection signals output from multiple rotation detection units and that outputs corrected signals, the rotation detection units changing outputs in accordance with a rotation angle of a rotor and being provided such that the rotation detection units output the detection signals that have different phases; a vector generation unit that performs addition and subtraction on two signals out of the corrected signals so as to generate two vector component signals that are perpendicular to each other; an amplitude correction unit that performs correction to match amplitudes of the two vector component signals so as to output corrected vector component signals; and a rotation-angle searching unit that searches for the rotation angle of the rotor on basis of a vector that is represented by the two corrected vector component signals and that outputs a detection angle.

A rotation-angle detection method includes: performing correction to match amplitude values of multiple detection signals output from multiple rotation detection units and outputting corrected signals, the rotation detection units changing outputs in accordance with a rotation angle of a rotor and being provided such that the rotation detection units output the detection signals that have different phases; performing addition and subtraction on two signals out of the corrected signals so as to generate two vector component signals that are perpendicular to each other; performing correction to match amplitudes of the two vector component signals so as to output corrected vector component signals; and searching for the rotation angle of the rotor on basis of a vector that is represented by the two corrected vector component signals and outputting a detection angle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 21 is a diagram that illustrates the relation between a detection angle and a two-phase pulse signal.

DETAILED DESCRIPTION OF THE PREFERRED EMBODIMENTS

Preferred embodiments of the present invention are explained in detail below with reference to the accompanying drawings. As the embodiment described below is a preferred embodiment of the present invention, various technically preferable limitations are given to it; however, the scope of the present invention is not unduly limited by the following explanation, and all of the components described in the present embodiment are not essential components of the present invention.

First Embodiment

Figure 1:
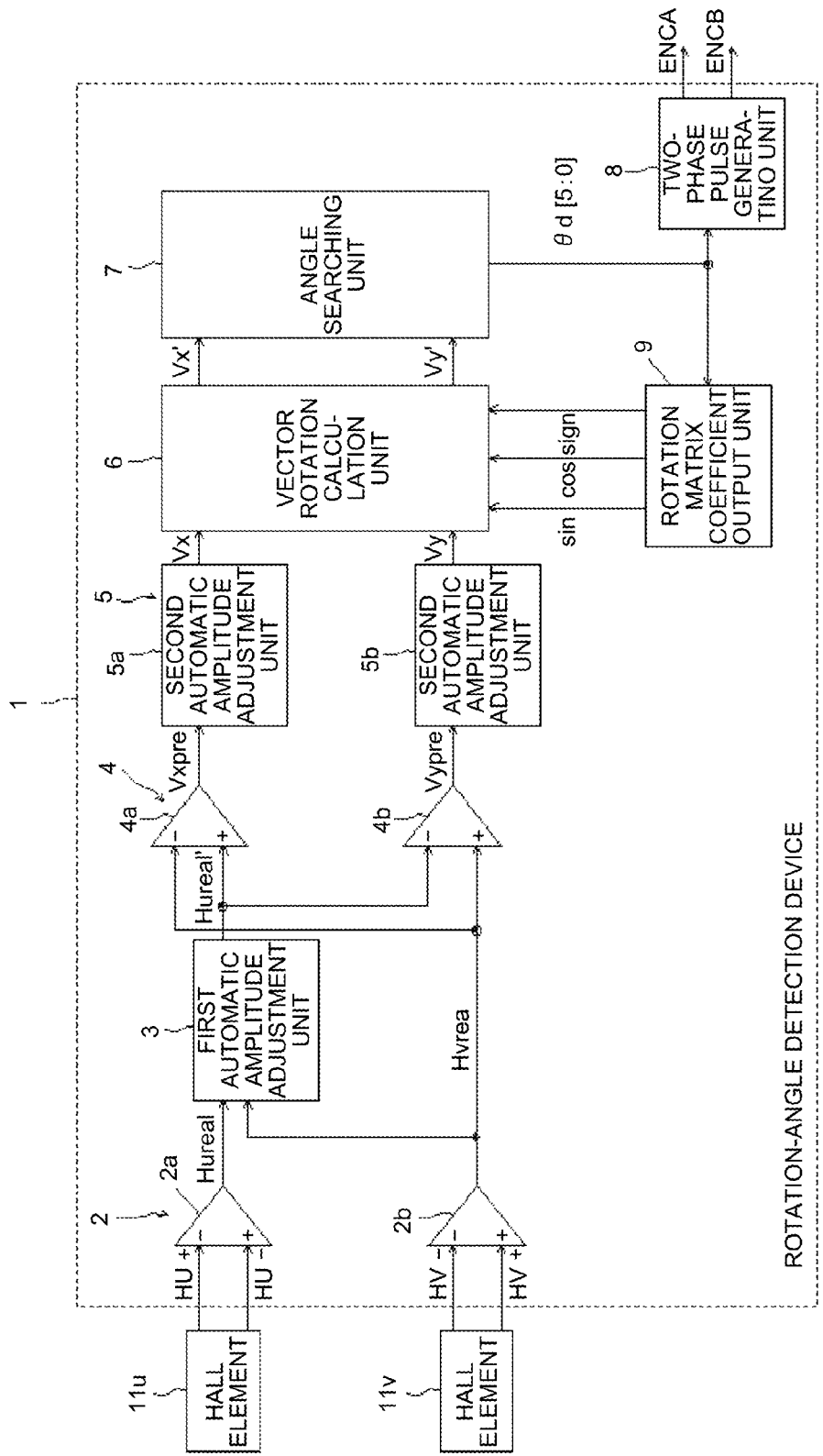
FIG. 1 is a circuit configuration diagram of a rotation-angle detection device that uses an embodiment of the present invention.

FIGS. 1 to 21 are diagrams that illustrate a first embodiment of a rotation-angle detection device, an image processing apparatus, and a rotation-angle detection method according to the present invention, and FIG. 1 is a circuit configuration diagram of a rotation-angle detection device 1 that uses the first embodiment of the rotation-angle detection device, the image processing apparatus, and the rotation-angle detection method according to the present invention.

In FIG. 1, the rotation-angle detection device 1 includes a differential unit 2, a first automatic amplitude adjustment unit 3, a vector generation unit 4, a second automatic amplitude adjustment unit 5, a vector rotation calculation unit 6, an angle searching unit 7, a two-phase pulse generation unit 8, and a rotation matrix coefficient output unit 9.

Figure 2:
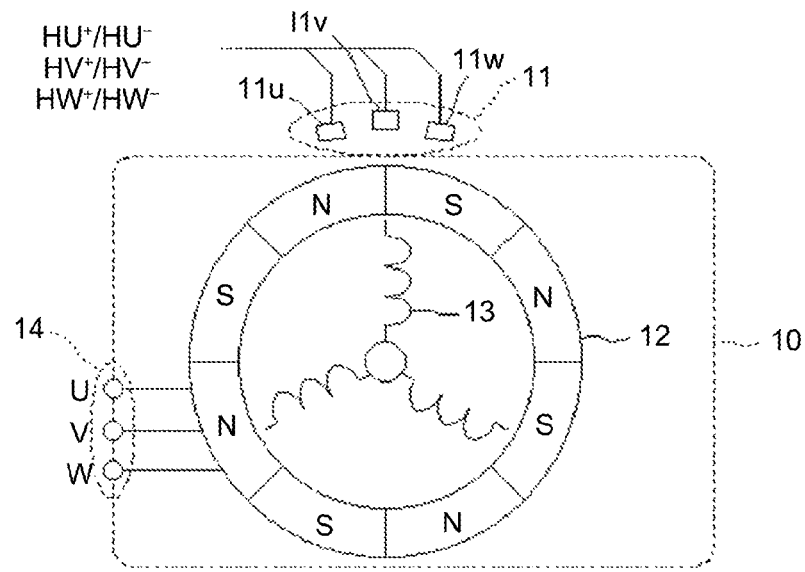
FIG. 2 is a schematic configuration diagram of a DC brushless motor.

Out of U-phase, V-phase, and W-phase differential signals HU+/HU−, HV+/HV−, and HW+/HW− that are output from Hall elements (rotation detection units) 11u, 11v, and 11w of a rotation detection unit 11 that is mounted for a DC brushless motor 10 illustrated in FIG. 2, the differential unit 2 receives input of the U-phase differential signal HU+/HU− and the V-phase differential signal HV+/HV−.

Specifically, the rotation-angle detection device 1 uses a rotor 12 (see FIG. 2) that is a rotary shaft of the DC brushless motor 10, as a rotator to be detected and detects the rotation angle of the rotor 12.

Furthermore, as illustrated in FIG. 2, the DC brushless motor 10 typically includes Y-connection coils 13 that have three phases, i.e., U phase, V phase, and W phase and that have a phase difference of 120 degrees from one another and includes the rotor 12 that is a permanent magnet that is opposed to the coils 13 and that has the south pole and the north pole that are alternately located. U-phase, V-phase, and W-phase drive currents from a terminal 14 are switched appropriately depending on the angle of the rotor 12 so that the DC brushless motor 10 is driven to rotate. Furthermore, in order to drive the rotor 12, the DC brushless motor 10 needs to apply voltages in directions perpendicular to the output directions of the differential signals detected by the Hall elements 11u, 11v, and 11w and to the directions of the magnetic flux; however, it is omitted from FIG. 2.

The rotation-angle detection device 1 and the DC brushless motor 10 are used in an image processing apparatus, such as a multifunction peripheral, and a rotary shaft (not illustrated) of the rotor 12 is coupled to a driving mechanism of the image processing apparatus.

Furthermore, the above-described Hall elements 11u, 11v, and 11w are fixedly installed at predetermined positions near the rotor 12, and they output the U-phase, V-phase, and W-phase differential signals HU+/HU−, HV+/HV−, and HW+/HW− that change in accordance with the magnetic field of the rotor 12. In the present embodiment, only zero cross detection of three-phase Hall signals is conducted by using the Hall elements 11u, 11v, and 11w in order to detect the current switching timing of the coils 13. In this case, the resolution with regard to the electric angle is 60.

In the present embodiment, as described above, the differential unit 2 of the rotation-angle detection device 1 receives input of only the U-phase differential signal HU+/HU− output from the Hall element 11u and the V-phase differential signal HV+/HV− output from the Hall element 11v out of the Hall elements 11u, 11v, and 11w. Other different two phases may be used.

The differential unit 2 includes two differential amplifiers 2a and 2b, the U-phase differential signal HU+/HU− is input to the differential amplifier 2a, and the V-phase differential signal HV+/HV− is input to the differential amplifier 2b.

The differential amplifier 2a causes the differential signal HU+/HU− to be single-ended and outputs, to the first automatic amplitude adjustment unit 3, an analog Hall signal HUreal that changes in a sine-wave pattern in accordance with the rotation angle of the rotor 12.

The differential amplifier 2b causes the differential signal HV+/HV− to be single-ended and outputs, to the first automatic amplitude adjustment unit 3 and the vector generation unit 4, an analog Hall signal HVreal that changes in a sine-wave pattern in accordance with the rotation angle of the rotor 12.

Figure 3:
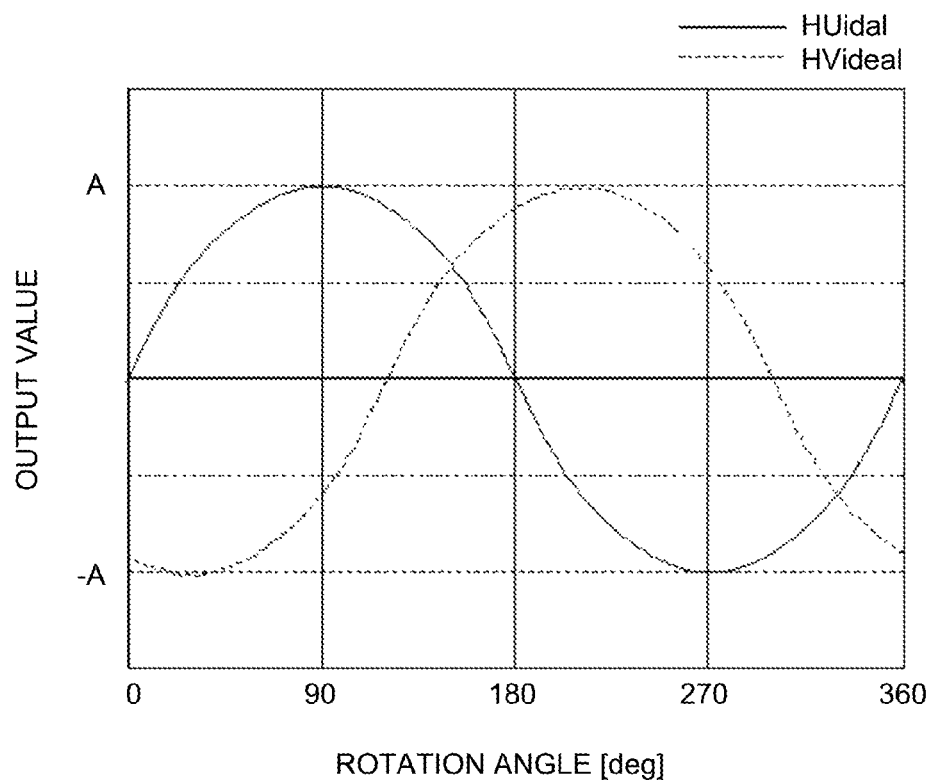
FIG. 3 is a graph that illustrates an example of ideal UV analog Hall signals.

The analog Hall signals are ideal analog Hall signals HUideal, HVideal that are illustrated in FIG. 3 in an ideal case where there is no deviation in the magnetization of the rotor 12 that is a permanent magnet, there is no deviation in the sensitivities of the Hall elements 11u and 11v, and there are no error causes, such as assembly errors of the Hall elements 11u and 11v.

As described above, the analog Hall signals are the signals (detection signals) that are obtained by passing, through the differential unit 2 illustrated in FIG. 1, the differential signals HU+/HU−, HV+/HV− that are output from the Hall elements 11u and 11v. The analog Hall signal changes in a sine-wave pattern in accordance with the rotation angle of the rotor 12. The ideal analog Hall signals HUideal, HVideal that can be obtained by using the configuration of the DC brushless motor 10 are the signals that have the relation represented by the following Equation (1).

$$\begin{cases} HUideal = Hu^+ - HU^- = A*\sin(\theta) \\ HVideal = HV^+ - HV^- = A*\sin\left(\theta - \frac{2}{3}\pi\right) \\ HWideal = Hw^+ - Hw^- = A*\sin\left(\theta + \frac{2}{3}\pi\right) \end{cases} \quad (1)$$

Although an analog Hall signal HWideal is also described in Equation (1), it is not treated in the present embodiment.

Furthermore, in the case of the present embodiment, as the number of magnetic poles of the rotor 12 of the DC brushless motor 10 is "8", four periods of the sine wave of the analog Hall signal illustrated in FIG. 3 correspond to one revolution of the rotor 12, i.e., a ¼ revolution of the rotor 12 corresponds to one period of the sine wave illustrated in FIG. 3. Therefore, the angle is represented in the present embodiment such that one period of the sine wave of the analog Hall signal corresponds to 360 degrees, and this angle θ is defined as a rotor angle. Furthermore, in the present embodiment, although the number of magnetic poles of the rotor 12 of the DC brushless motor 10 that is the subject to be detected is "8" (four pairs), the number of magnetic poles is not limited to "8". Moreover, in order to drive the Hall elements 11u, 11v, and 11w, it is necessary to apply voltages in directions perpendicular to the output directions of the above-described differential signals and to the directions of the magnetic flux to be detected; however, it is omitted in FIG. 3.

The ideal analog Hall signals HUideal, HVideal have the same amplitude and have a phase difference of 120 degrees.

Figure 4:
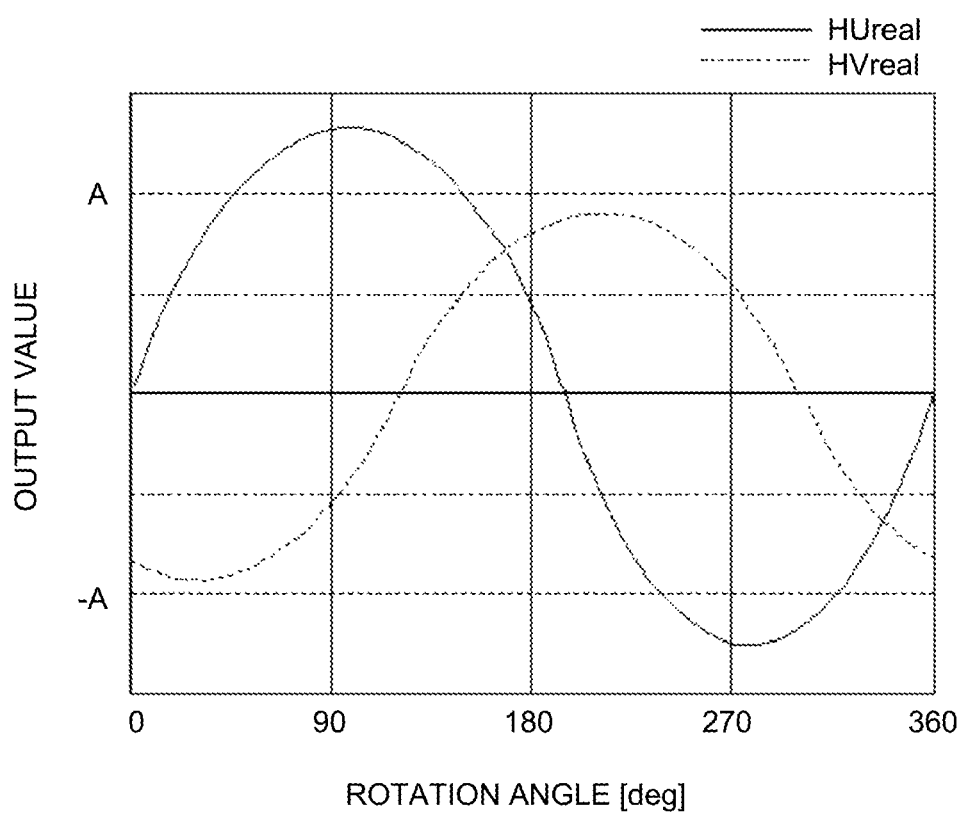
FIG. 4 is a graph that illustrates an example of actual UV analog Hall signals.

Furthermore, if the actual analog Hall signals output from the Hall elements 11u, 11v, and 11w are caused to be single-ended by the differential unit 2, they become the actual analog Hall signals HUreal, HVreal that have the waveform illustrated in FIG. 4. This is caused by deviation of the magnetization of the rotor 12 of the DC brushless motor 10, deviation of the sensitivities of the Hall elements 11u, 11v, and 11w, and assembly errors of the Hall elements 11u, 11v, and 11w.

With regard to the actual analog Hall signals HUreal, HVreal, as illustrated in FIG. 4, the amplitudes of the U-phase analog Hall signal HUreal and the V-phase analog Hall signal HVreal are different from each other and the phase difference therebetween is not 120 degrees.

The actual analog Hall signals HUreal, HVreal are the signals that have the relation represented by the following Equation (2).

$$\begin{cases} HUreal = Au*\sin(\theta) \\ HVreal = Av*\sin\left(\theta\frac{2}{3}\pi + \Delta\theta\right) = AV*\sin(\theta + \alpha) \end{cases} \quad (2)$$

The difference between the amplitudes Au, Av represented by Equation (2) is caused by deviation of the magnetization of the rotor 12, errors in the sensitivities of the Hall elements 11u and 11v, or the like, and the phase difference Δθ is cause by assembly errors of the Hall elements 11u and 11v, and/or the like.

As described below, by the processes of the first automatic amplitude adjustment unit 3, the vector generation unit 4, and the second automatic amplitude adjustment unit 5, the rotation-angle detection device 1 generates two sine-wave signals that have the same amplitude and a phase difference of 90 degrees from two sine-wave signals that have different amplitudes and have a phase difference.

Furthermore, it is assumed that, during the vector rotation calculation that is described below, the two sine-wave signals that have the same amplitude and a phase difference of 90 degrees are used as a component X and a component Y of a rotator vector. As long as signals deviated from the assumed sine-wave signals are used, the angle detected by the angle detection device has an error.

After passing the subsequent processing units, i.e., the first automatic amplitude adjustment unit 3, the vector generation unit 4, and the second automatic amplitude adjustment unit 5, two sine-wave signals that have the same amplitude and a phase difference of 90 degrees are generated from the two sine-wave signals that have different amplitudes and have a phase difference.

Figure 5:
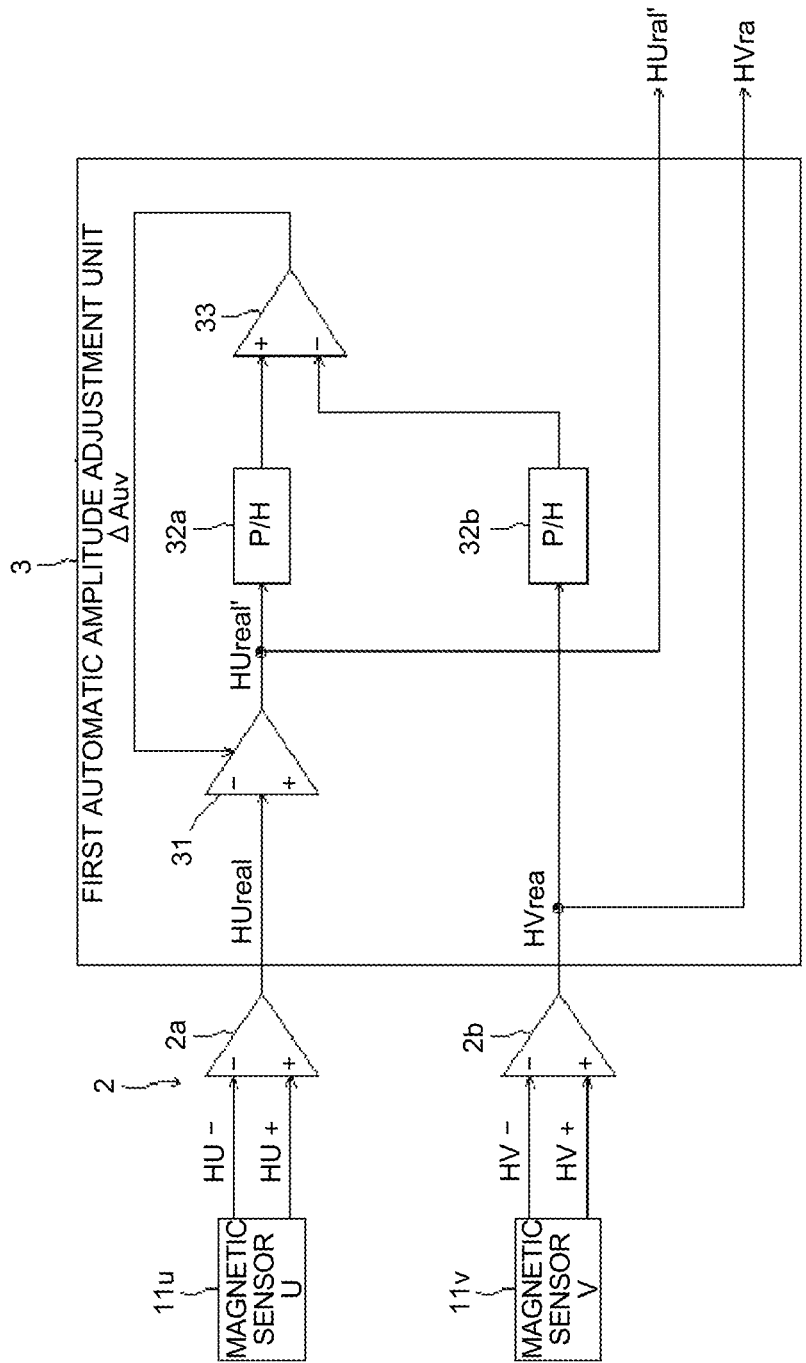
FIG. 5 is a circuit configuration diagram of a first automatic amplitude adjustment unit.

Furthermore, the first automatic amplitude adjustment unit (amplitude adjustment unit) 3 has a circuit configuration as illustrated in FIG. 5, and it includes a variable gain amplifier 31, peak hold circuits (P/H) 32a, 32b, a comparator 33, or the like.

The variable gain amplifier (signal-amplitude adjustment unit) 31 receives input of the actual analog Hall signal HUreal from the differential amplifier 2a and receives feedback input of, as a gain adjustment signal, an output control voltage ΔAuv that is output from the comparator 33. The variable gain amplifier 31 adjusts the amplitude of the analog Hall signal HUreal on the basis of the gain adjustment signal received from the comparator 33 so as to obtain a first amplitude-adjusted analog Hall signal (corrected value) HUreal' and output it to the vector generation unit 4 and the peak hold circuit 32a.

The peak hold circuit (peak hold unit) 32a holds the peak of the first amplitude-adjusted analog Hall signal HUreal' that is output from the variable gain amplifier 31 and outputs it to the comparator 33.

In the first automatic amplitude adjustment unit 3, the actual analog Hall signal HVreal received from the differential amplifier 2b is output to the vector generation unit 4 without change and is also input to the peak hold circuit 32b.

The peak hold circuit (base-peak hold unit) 32b holds the peak of the actual analog Hall signal HVreal received from the differential amplifier 2b and outputs it to the comparator 33.

The comparator 33 (adjustment-value determination unit) compares the peak value of the first amplitude-adjusted analog Hall signal HUreal' that is held by the peak hold circuit 32a with the peak value of the actual analog Hall signal HVreal that is held by the peak hold circuit 32b. The comparator 33 feeds the output control voltage ΔAuv, which is the result of the above comparison, as a gain adjustment signal (correction value), back to the variable gain amplifier 31.

Figure 6:
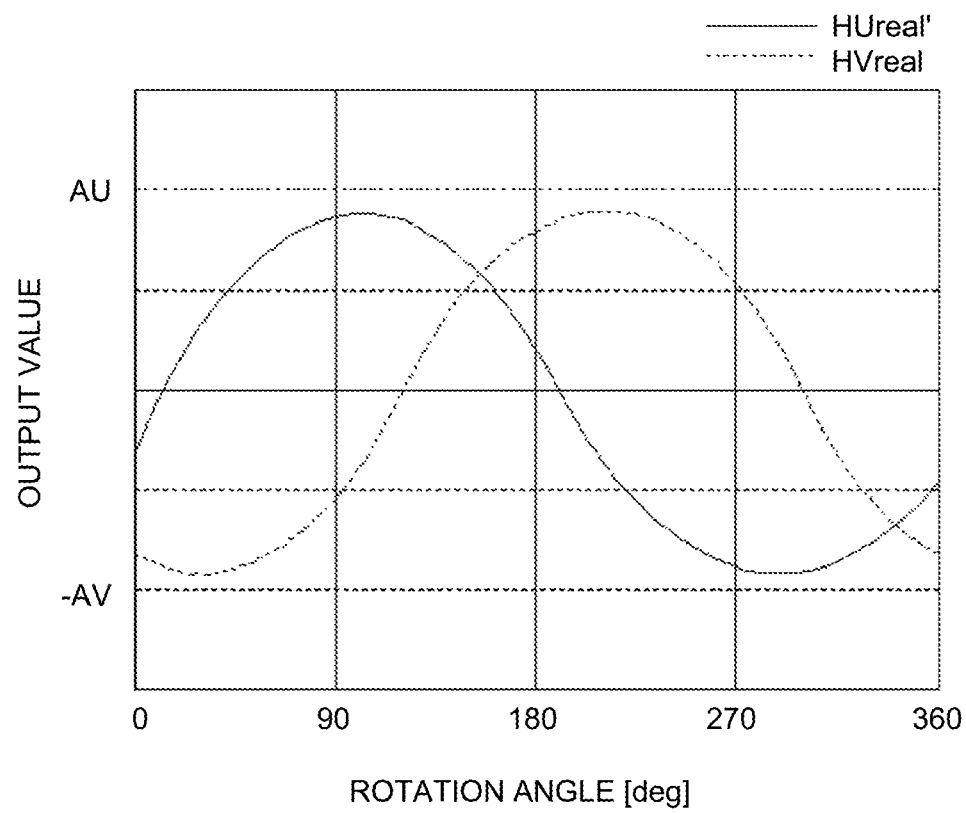
FIG. 6 is a graph that illustrates the relation between a first amplitude-adjusted analog Hall signal HUreal' and an actual analog Hall signal HUreal.

The output control voltage ΔAuv output from the comparator 33 represents the degree of difference between the amplitudes of the first amplitude-adjusted analog Hall signal HUreal' and the actual analog Hall signal HVreal, and it is output as a gain adjustment signal to the variable gain amplifier 31. Therefore, the variable gain of the variable gain amplifier 31 is controlled on the basis of the control voltage ΔAuv so that the amplitude of the first amplitude-adjusted analog Hall signal HUreal' can match the amplitude of the actual analog Hall signal HVreal as illustrated in FIG. 6.

In this case, the first amplitude-adjusted analog Hall signal HUreal' and the actual analog Hall signal HVreal have the relation of the following Equation (3).

$$\begin{cases} HUreal' = Av * \sin(\theta) \\ HVreal = Av * \sin(\theta + \alpha) \end{cases} \quad (3)$$

As represented by Equation (3), although the first amplitude-adjusted analog Hall signal HUreal' and the actual analog Hall signal HVreal have a matching amplitude at this stage, the phase difference is sometimes shifted from 90 degrees by a phase indicated by α.

Although the first automatic amplitude adjustment unit 3 of FIG. 5 adjusts the amplitude of the analog Hall signal HUreal so as to match the amplitude of the analog Hall signal HVreal, it may adjust the amplitude of the analog Hall signal HVreal so as to match the amplitude of the analog Hall signal HUreal. Furthermore, the first automatic amplitude adjustment unit 3 may adjust the two amplitudes of the analog Hall signal HUreal and the analog Hall signal HVreal so as to match a predetermined amplitude.

The vector generation unit (vector generation unit) 4 includes a subtraction amplifier 4a and an addition amplifier 4b, and the first amplitude-adjusted analog Hall signal HUreal' and the actual analog Hall signal HVreal, which have a matching amplitude, are input to them.

As described below, the subtraction amplifier 4a and the addition amplifier 4b perform addition and subtraction operations on the first amplitude-adjusted analog Hall signal HUreal' and the actual analog Hall signal HVreal so as to generate a signal Vxpre and a signal Vypre that have a phase difference of just 90 degrees. However, the amplitudes of the two signals Vxpre and Vypre do not match at this point.

Specifically, as described above, the first amplitude-adjusted analog Hall signal HUreal' with amplitude adjusted by the first automatic amplitude adjustment unit 3 and the actual analog Hall signal HVreal have a matching amplitude; therefore, if addition and subtraction are performed on the two sine waves, sine waves that have a phase difference of 90 degrees are obtained.

Specifically, out of the first amplitude-adjusted analog Hall signal HUreal' and the actual analog Hall signal HVreal that are represented by Equation (3), if the actual analog Hall signal HVreal is modified by using the addition theorem, the following Equation (4) is obtained.

$$\begin{cases} HUreal' = Av * \sin(\theta) \\ HVreal = Av * \sin(\theta + \alpha) = Av * \sin\theta\cos\alpha + Av * \cos\theta\sin\alpha \end{cases} \quad (4)$$

If addition and subtraction are performed on the two equations represented by Equation (4), the following Equation (5) is obtained.

$$\begin{cases} HUreal' + HVreal = Av * (1 + \cos\alpha)\sin\theta + Av * \sin\alpha\cos\theta \\ HUreal' - HVreal = Av * (1 - \cos\alpha)\sin\theta - Av * \sin\alpha\cos\theta \end{cases} \quad (5)$$

If a formula for composition of the trigonometric function is applied to the two equations represented by Equation (5), the following Equation (6) is obtained.

$$\begin{cases} HUreal' + HVreal = Av * \sqrt{(1+\cos\alpha)^2 + \sin^2\alpha} \,* \\ \sin(\theta + \phi 1) = Aypre * \sin(\theta + \phi 1) \\ HUreal' - HVreal = Av * \sqrt{(1-\cos\alpha)^2 + \sin^2\alpha} \,* \\ \sin(\theta + \phi 2) = Axpre * \sin(\theta + \phi 2) \end{cases} \quad (6)$$

$$\begin{cases} Av * \sqrt{(1+\cos\alpha)^2 + \sin^2\alpha} = Aypre \\ Av * \sqrt{(1-\cos\alpha)^2 + \sin^2\alpha} = Axpre \end{cases}$$

The values of the angle φ1 and the angle φ2 represented in Equation (6) are obtained as in the following Equation (7).

$$\begin{cases} \phi 1 = \arctan\left(\dfrac{\sin\alpha}{1+\cos\alpha}\right) \\ \phi 2 = \arctan\left(\dfrac{-\sin\alpha}{1-\cos\alpha}\right) \end{cases} \quad (7)$$

Specifically, it can be understood that the angle φ1 is the angle that is formed by the vector A (1+cos α, sin α) and the X axis, and the angle φ2 is the angle that is formed by the vector B (1−cos α, −sin α) and the X axis. Furthermore, the inner product of the two vectors A and B is obtained as in the following Equation (8).

$$\begin{aligned} \vec{A} \cdot \vec{B} &= (1+\cos\alpha)*(1-\cos\alpha) + \sin\alpha*(-\sin\alpha) \\ &= \sin^2\alpha - \sin^2\alpha = 0 \end{aligned} \quad (8)$$

Specifically, as the inner product of the vectors A and B is "0", the angle (φ1+φ2) that is formed by the vectors A and B is 90 degrees.

Thus, the vector generation unit 4 performs addition and subtraction operations on the first amplitude-adjusted analog Hall signal HUreal' and the actual analog Hall signal HVreal, which are the sine waves that have a matching amplitude, thereby obtaining the two vector component signals Vxpre, Vypre that have a phase difference of 90 degrees.

Figure 7:
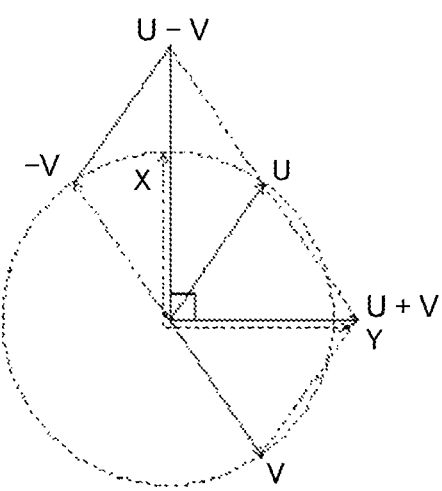
FIG. 7 is an explanatory diagram of a vector generation operation performed by a vector generation unit.

Specifically, as illustrated in FIG. 7, the U axis and the V axis are plotted in any different directions in the XY axis. If unit vectors U, V of length 1 on the U axis and the V axis are assumed, the inner product of the added vector (U+V) and the subtracted vector (U−V) is U·U+(−V)·V=1−1=0, and the vector (U+V) and the vector (U−V) form a right angle (90 degrees). That is, it has the same meaning as that the diagonals of rhombuses always orthogonally intersect each other.

Figure 8:
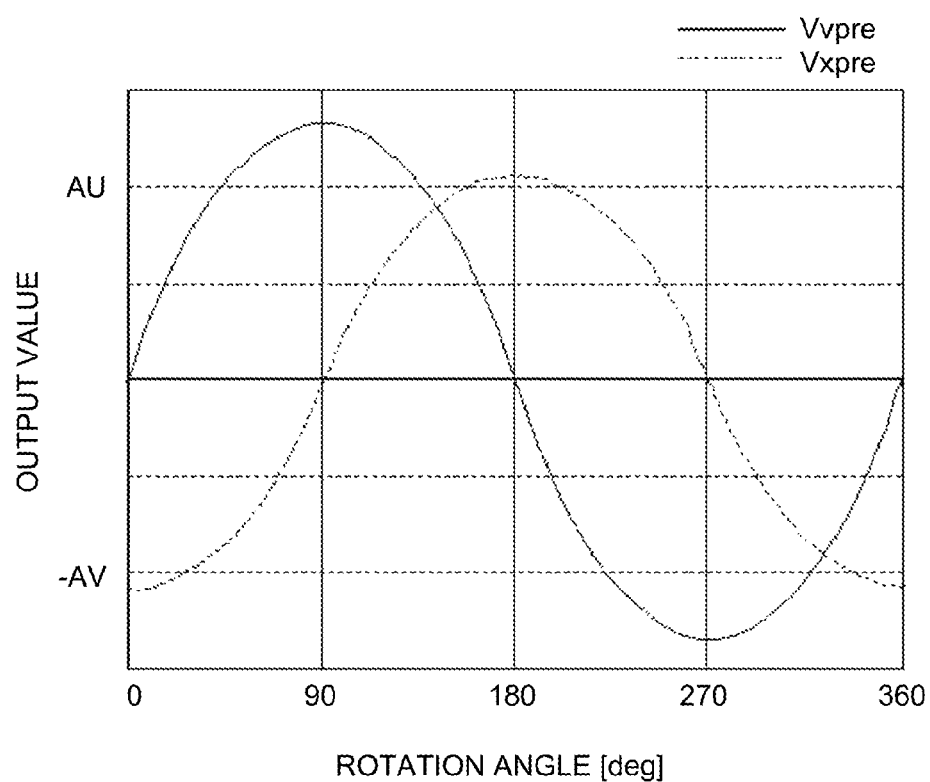
FIG. 8 is a graph that illustrates an example of a vector component on which orthogonal transformation is performed by the vector generation unit.

However, although the vector component signal Vxpre and the vector component signal Vypre, which are generated by the vector generation unit 4, have a phase difference of 90 degrees due to orthogonalization, the amplitudes thereof sometimes do not match, as illustrated in FIG. 8.

The vector generation unit 4 then outputs the above-described generated vector component signals Vxpre, Vypre, which indicate the components of a vector, to the second automatic amplitude adjustment unit 5.

The second automatic amplitude adjustment unit (amplitude correction unit) 5 includes a second automatic amplitude adjustment unit 5a and a second automatic amplitude adjustment unit 5b. The second automatic amplitude adjustment unit 5a and the second automatic amplitude adjustment unit 5b include variable gain amplifiers 51a, 51b, peak hold circuits 52a, 52b, comparators 53a, 53b, reference-amplitude value output units 54a, 54b, or the like.

Figures 9A, 9B:
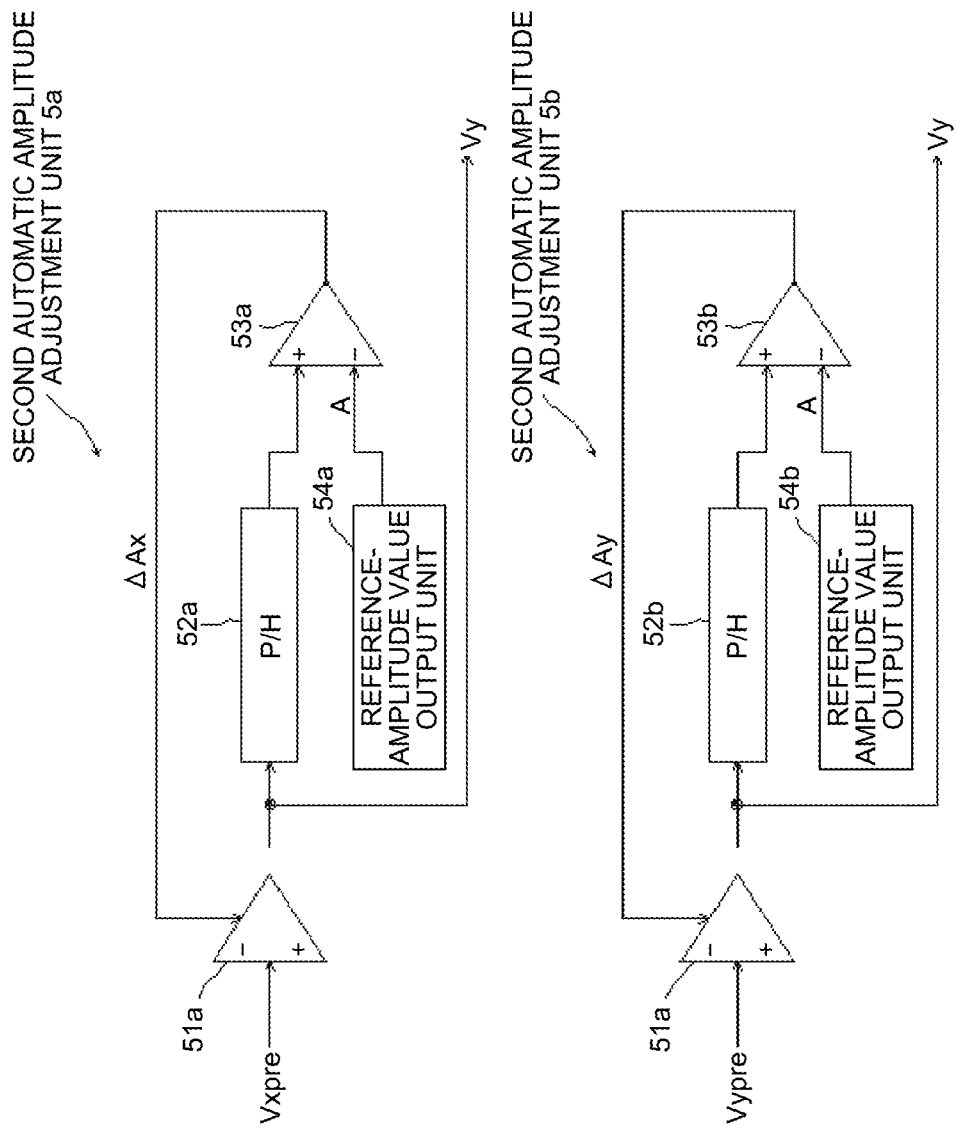
FIGS. 9A and 9B are circuit configuration diagrams of a second automatic amplitude adjustment unit.

As illustrated in FIG. 9A, in the second automatic amplitude adjustment unit (amplitude correction unit) 5a, the vector component signal Vxpre is input to the variable gain amplifier 51a from the subtraction amplifier 4a of the vector generation unit 4, and an output control voltage (correction value) ΔAx is fed back and is input as a gain adjustment signal from the comparator 53a to the variable gain amplifier 51a. The variable gain amplifier (signal-amplitude correction unit) 51a adjusts the amplitude of the vector component signal Vxpre on the basis of the output control voltage ΔAx that is a gain adjustment signal from the comparator 53a so as to obtain a vector component signal (corrected vector component signal) Vx and output it to the vector rotation calculation unit 6 and the peak hold circuit 52a.

The peak hold circuit (peak hold unit) 52a holds the peak value (corrected peak value) of the vector X-axis component Vx that is output from the variable gain amplifier 51a and outputs it to the comparator 53a.

The reference-amplitude value output unit 54a outputs, to the comparator 53a, a reference voltage A that indicates a reference amplitude value.

The comparator (correction-value determination unit) 53a compares the peak value (corrected peak value) of the vector component signal Vx that is held by the peak hold circuit 52a with the reference voltage A. The comparator 53a feeds the output control voltage ΔAx, which is the result of the above comparison, as a gain adjustment signal (correction value) back to the variable gain amplifier 51a.

Figure 10:
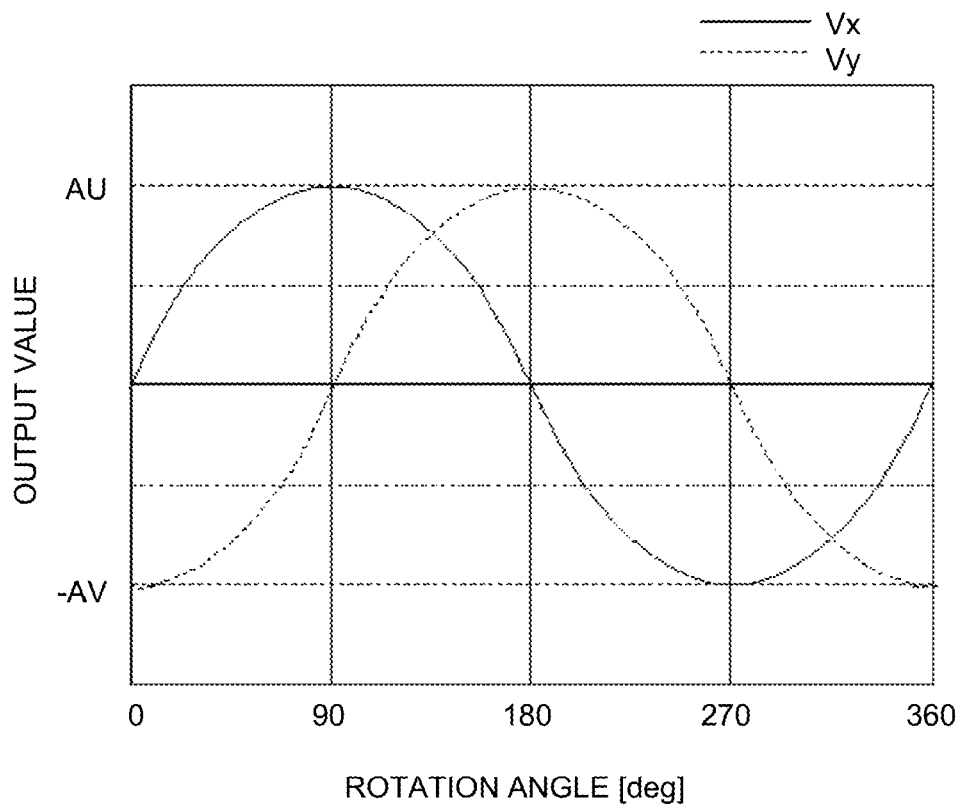
FIG. 10 is a graph that illustrates an example of a vector component that is output from the second automatic amplitude adjustment unit.

The output control voltage ΔAx output from the comparator 53a indicates the degree of difference between the amplitude of the vector X-axis component Vxpre and the reference amplitude indicated by the reference voltage A, and it is output as a gain adjustment signal to the variable gain amplifier 51a. Therefore, the variable gain of the variable gain amplifier 51a is controlled on the basis of the control voltage ΔAx so that the amplitude of the vector X-axis component Vx can match the reference amplitude indicated by the reference voltage A, as illustrated in FIG. 10.

Furthermore, as illustrated in FIG. 9B, in the second automatic amplitude adjustment unit (amplitude correction unit) 5b, the vector component signal Vypre is input to the variable gain amplifier 51b from the addition amplifier 4b of the vector generation unit 4, and an output control voltage (correction value) ΔAy is fed back and is input as a gain adjustment signal from the comparator 53b to the variable gain amplifier 51b. The variable gain amplifier (signal-amplitude correction unit) 51b adjusts the amplitude of the vector component signal Vypre on the basis of the output control voltage ΔAy that is a gain adjustment signal from the comparator 53b so as to obtain a vector component signal (corrected vector component signal) Vy and output it to the vector rotation calculation unit 6 and the peak hold circuit 52b.

The peak hold circuit (peak hold unit) 52b holds the peak value (corrected peak value) of the vector Y-axis component Vy that is output from the variable gain amplifier 51b and outputs it to the comparator 53b.

The reference-amplitude value output unit 54b outputs, to the comparator 53b, the reference voltage A that indicates a reference amplitude value.

The comparator (correction-value determination unit) 53b compares the peak value (corrected peak value) of the vector component signal Vy that is held by the peak hold circuit 52b with the reference voltage A. The comparator 53b feeds the output control voltage ΔAy, which is the result of the above comparison, as a gain adjustment signal (correction value) back to the variable gain amplifier 51b.

The output control voltage ΔAy output from the comparator 53b indicates the degree of difference between the amplitude of the vector Y-axis component Vypre and the reference amplitude indicated by the reference voltage A, and it is output as a gain adjustment signal to the variable gain amplifier 51b. Therefore, the variable gain of the variable gain amplifier 51b is controlled on the basis of the control voltage ΔAy so that the amplitude of the vector Y-axis component Vy can match the reference amplitude indicated by the reference voltage A, as illustrated in FIG. 10.

As the reference voltage A output from the reference-amplitude value output unit 54a of the second automatic amplitude adjustment unit 5a has the same voltage value as the reference voltage A output from the reference-amplitude value output unit 54b of the second automatic amplitude adjustment unit 5b, the amplitude values of the vector X-axis component Vx and the vector Y-axis component Vy can match, as illustrated in FIG. 10. Furthermore, as illustrated in FIG. 10, the vector X-axis component Vx and the vector Y-axis component Vy have a phase difference of 90 degrees. Moreover, in the same manner as the first automatic amplitude adjustment unit 3, the second automatic amplitude adjustment unit 5a may adjust one of the amplitude values so as to match the other one of the amplitude values or may adjust the two amplitude values so as to match a predetermined amplitude value.

Figure 11:
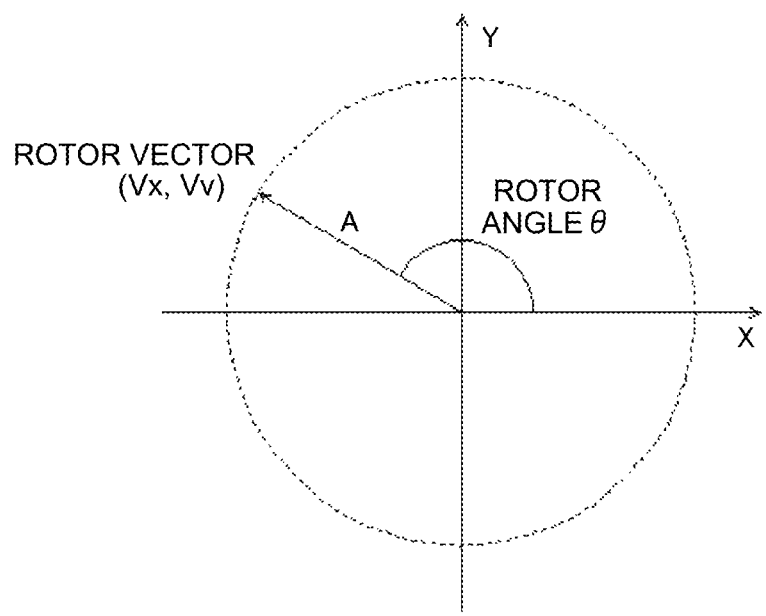
FIG. 11 is a diagram that illustrates a rotor vector that is plotted on the polar coordinates.

If the above-described vector X-axis component Vx and the vector Y-axis component Vy are plotted on the polar coordinates with the X axis and the Y axis, they are represented as illustrated in FIG. 11. In the following, the vector represented by the vector X-axis component Vx and the vector Y-axis component Vy is referred to as a rotor vector. As illustrated in FIG. 11, the rotor vector (Vx, Vy) rotates in a circle that has a radius A on the X-Y plane in accordance with a change in the angle (hereafter, referred to as the rotor angle) θ of the rotor 12. Furthermore, in the present embodiment, the X axis is a reference axis, and the angle formed by the X axis in a positive direction and the rotor vector (Vx, Vy) is the rotor angle θ.

Figure 12:
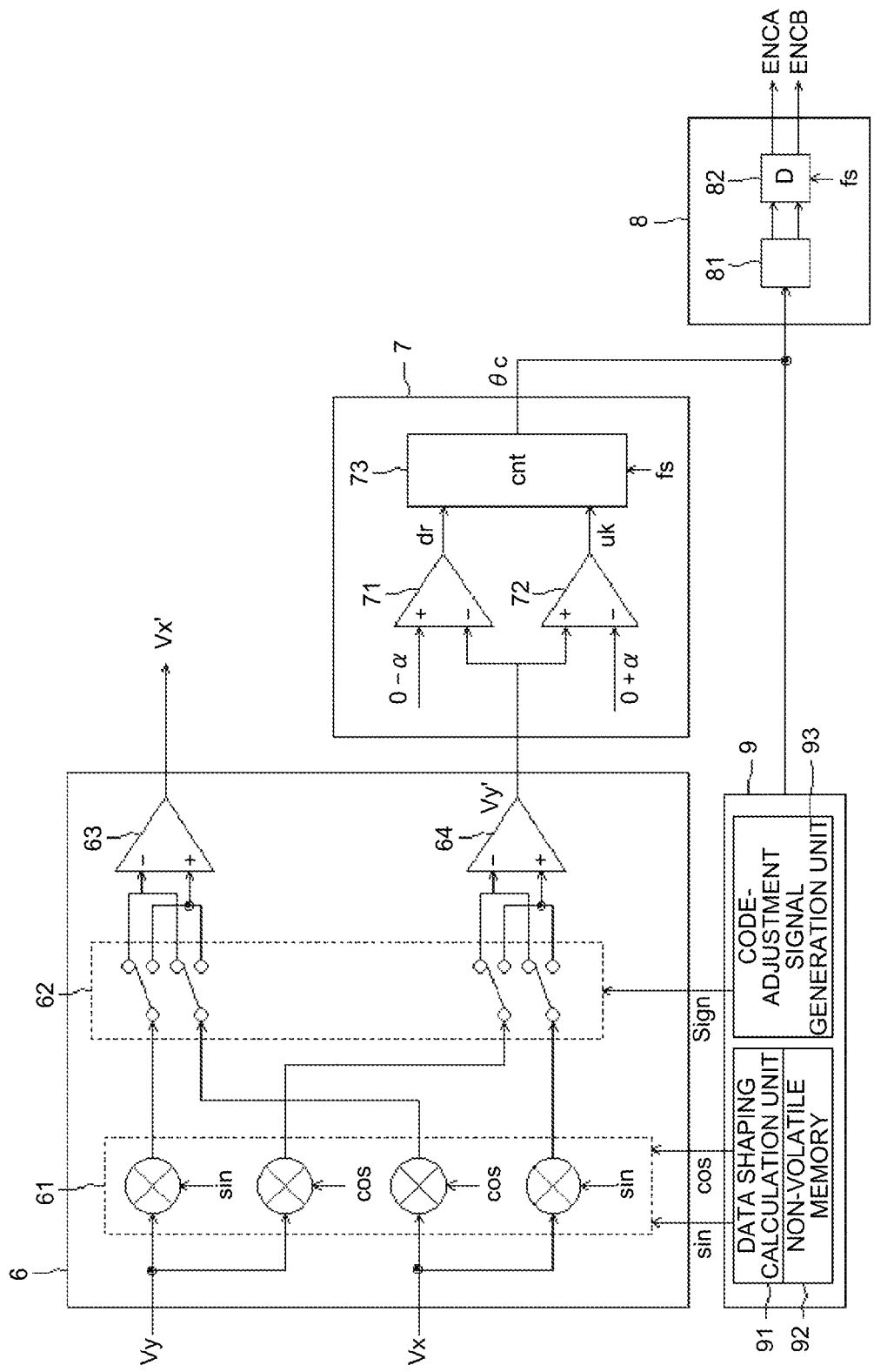
FIG. 12 is a circuit configuration diagram of a vector rotation calculation unit, an angle searching unit, a two-phase pulse generation unit, and a rotation matrix coefficient output unit.

Furthermore, the vector rotation calculation unit 6, the angle searching unit 7, the two-phase pulse generation unit 8, and the rotation matrix coefficient output unit 9 have a circuit configuration as illustrated in FIG. 12.

As illustrated in FIG. 12, the vector rotation calculation unit 6 includes a multiplication unit 61, a sign adjustment switch unit 62, addition/subtraction amplifiers 63, 64, or the like. The vector rotation calculation unit 6 uses sine (sin) data that is a reference sine wave from the rotation matrix coefficient output unit 9, cosine (cos) data, and a sign adjustment signal Sign to perform a vector calculation represented by the following Equation (9) on the vector (hereafter, referred to as the rotor vector) represented by the vector X-axis component Vx and the vector Y-axis component Vy in accordance with the value of detection angle data θd, which will be explained later, so as to perform rotation transformation, and outputs the vector represented by a transformed X-axis component Vx' and a transformed Y-axis component Vy' (hereafter, the vector represented by (Vx', Vy') is referred to as the rotation transformation vector).

$$\begin{pmatrix} Vx' \\ Vy' \end{pmatrix} = \begin{pmatrix} \cos\theta r & \sin\theta r \\ -\sin\theta r & \cos\theta r \end{pmatrix} \begin{pmatrix} Vx \\ Vy \end{pmatrix} \quad (9)$$

The rotation matrix coefficient output unit 9 includes a data shaping calculation unit 91, a non-volatile memory 92, a sign-adjustment signal generation unit 93, or the like, and the detection angle data θd output from the angle searching unit 7, which will be explained later, is input to it.

The non-volatile memory 92 includes a read only memory (ROM), or the like, and one period of a sine wave is divided into n, e.g., 64 and, out of the sines for which the amplitude is represented by 127 [LSB], the sines for which the absolute values of the amplitudes do not overlap, for example, 17 sines in total, i.e., the sine with a phase of 0 degree, 15 sines with a phase in the range between 0 to 90 degrees, and the sine with a phase of 90 degrees, are previously stored as sine data.

The data shaping calculation unit 91 uses the sine data (reference sine-wave data) that is stored in the non-volatile memory 92 to shape the data on the absolute value of the amplitude of the sine and cosine in accordance with the detection angle data θd and outputs the sine (sin) data and the cosine (cos) data to the multiplication unit 61 of the vector rotation calculation unit 6.

The sign-adjustment signal generation unit 93 generates the sign adjustment signal Sign on the basis of the detection angle data θd that is output from the angle searching unit 7 and outputs it to the sign adjustment switch unit 62 of the vector rotation calculation unit 6.

Furthermore, in the vector rotation calculation unit 6, the multiplication unit (a rotation-vector generation unit, a multiplication unit) 61 has four resistive ladder type multiplication digital analog converters (DAC) arranged in parallel, and the vector X-axis component Vx and the Y-axis component Vy are input to it from the second automatic amplitude adjustment unit 5a and the second automatic amplitude adjustment unit 5b.

The multiplication unit 61 multiplies the vector X-axis component Vx and the Y-axis component Vy received from the second automatic amplitude adjustment units 5a, 5b by an analog sine absolute value |sin| and an analog cosine absolute value |cos| that have been changed into analog values in proportion to the values on the basis of the sine data sin and the cosine data cos that are input from the data shaping calculation unit 91, and outputs the multiplication results Vx*|sin|, Vx*|cos|, Vy*|sin|, Vy*|cos| to the sign adjustment switch unit 62.

The sign adjustment switch unit (sign switch unit) 62 receives input of Vx*|sin|, Vx*|cos|, Vy*|sin|, Vy*|cos| from the multiplication unit 61 and receives input of the sign adjustment signal Sign that is generated on the basis of θd [5:4] from the sign-adjustment signal generation unit 93. In accordance with the sign adjustment signal Sign, the sign adjustment switch unit 62 switches Vx*|sin|, Vx*|cos|, Vy*|sin|, Vy*|cos| that are input to the positive-phase and negative-phase input terminals of the addition/subtraction amplifiers 63, 64. The sign adjustment switch unit 62 performs the switch operation each time the phase is changed by 90 degrees in the detection angle data θd, whereby the calculation of Vx'=Vx*cos+Vy*sin, Vy'=−Vx*sin+Vy*cos can be fulfilled.

The addition/subtraction amplifier (rotation-transformation vector generation unit) 63 perform addition and subtraction on the multiplication result of the multiplication unit 61, i.e., Vx*|cos| and Vy*|sin|, and outputs the transformed X-axis component Vx'. Furthermore, the addition/subtraction amplifier 63 may be configured to add a gain to the above-described addition and subtraction.

The addition/subtraction amplifier (rotation-transformation vector generation unit) 64 perform addition and subtraction on the multiplication result of the multiplication unit 61, i.e., Vx*|sin| and Vy*|cos|, and outputs the transformed Y-axis component Vy'. Furthermore, the addition/subtraction amplifier 64 may be configured to add a gain to the above-described addition and subtraction.

Figure 13:
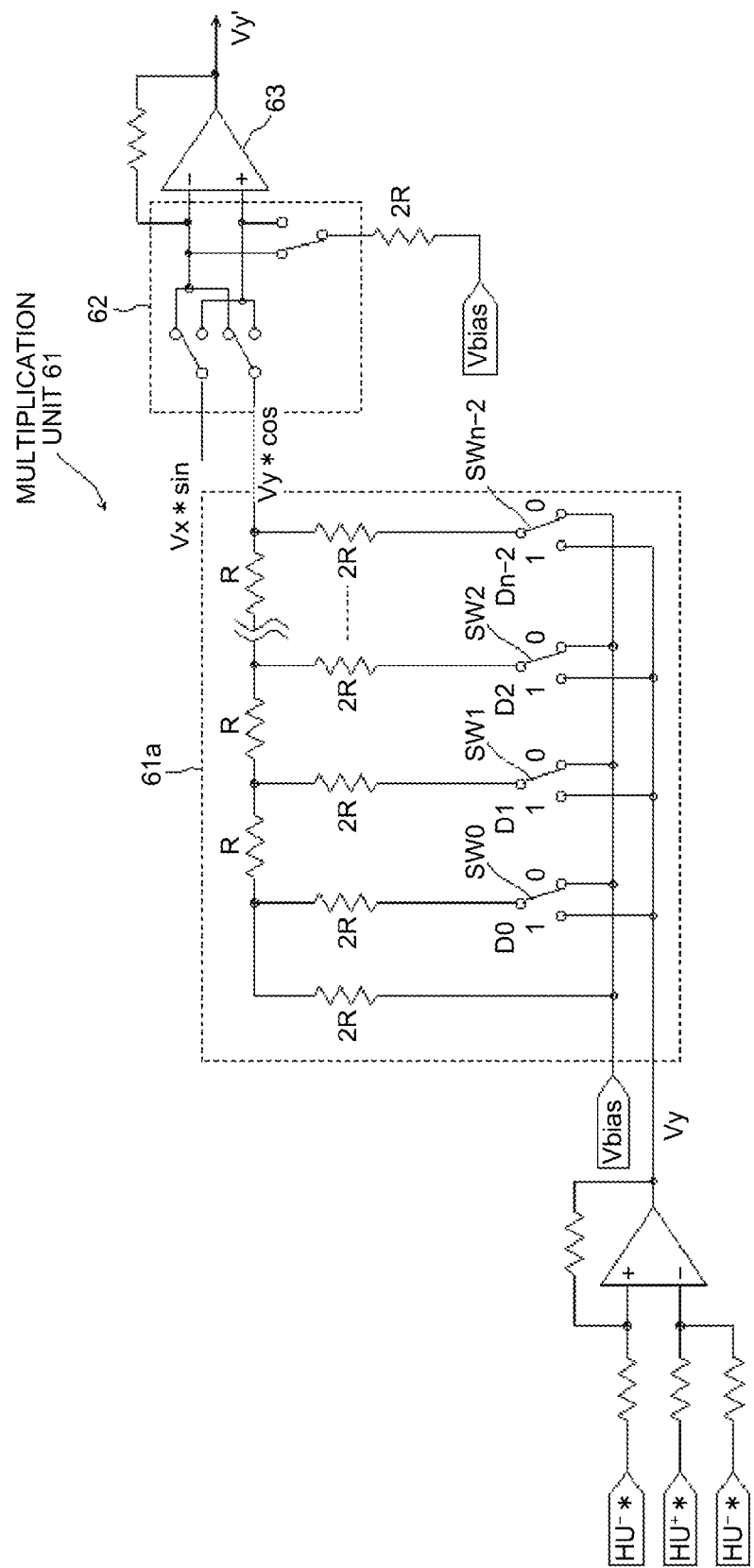
FIG. 13 is a relevant-part circuit configuration diagram of a multiplication unit that uses a resistive ladder type multiplication DAC in the vector rotation calculation unit.

As described above, the multiplication unit 61 of the vector rotation calculation unit 6 uses a resistive ladder type multiplication DAC circuit and, as illustrated in FIG. 13, the resistive ladder type multiplication DAC circuit uses a typical resistive ladder type multiplication DAC circuit 61a. Furthermore, although FIG. 13 illustrates the single resistive ladder type multiplication DAC circuit 61a of the multiplication unit 61 for the Y-axis component Vy, the four resistive ladder type multiplication DAC circuits 61a that have such a circuit configuration are used in parallel in the multiplication unit 61.

The resistive ladder type multiplication DAC circuit 61a has resistors that have a resistance value R and a resistance value 2R connected like a ladder in a regular manner, and switches SW0 to SWn−2 are provided for the resistors of 2R, the switches SW0 to SWn−2 being connected to any of a bias voltage Vbias and Vy (or Vx). Typically, electronic switches (analog switches) are used for the switches SW0 to SWn−2.

If the above resistive ladder type multiplication DAC circuit 61a is used in the multiplication unit 61, it is configured by using the resistors R that have the same resistance value (2R is obtained by serially connecting two resistors R that have R); therefore, if a monolithic integrated circuit (IC) is used, a multiplication operation can be performed with a higher accuracy. An output voltage Vout that is obtained during the process of the resistive ladder type multiplication DAC circuit 61a is determined by using the following Equation (10).

$$Vout = \left( \frac{2^0 D_0 + 2^1 D_1 + \ldots + 2^{n-2} D_{n-2}}{2^{n-1}} \right) \times Vref \quad (10)$$

In Equation (10), D0 to Dn−2 correspond to the switches SW0 to SWn−2 of the resistive ladder type multiplication DAC circuit 61a, and either "0" or "1" is input to it. Furthermore, the coefficient of Vref can be a value from "0" (all of Ds are "0") to 2n−1−½n−1=1 (all of Ds are "1").

Therefore, it is possible to represent multiplications of the sine and cosine by switching the switches SW0 to SWn−2.

However, only multiplication of a positive multiplier can be performed by the resistive ladder type multiplication DAC circuit 61a only. Usually, in order to perform 4-quadrant multiplication by using the resistive ladder type multiplication DAC circuit 61a, the sign adjustment switch unit 62 is provided prior to or subsequent to the resistive ladder type multiplication DAC circuit 61a if addition and subtraction are needed, and the objects for addition and subtraction are switched so that a calculation operation equivalent to 4-quadrant multiplication can be performed.

Thus, it is possible to eliminate a single operational amplifier and a ladder corresponding to one bit with respect to a single multiplier in the multiplication unit 61, and it is possible to reduce costs.

Furthermore, as illustrated in FIG. 12, the angle searching unit 7 includes comparators 71, 72, a repeat counter 73, or the like. In the angle searching unit 7, the transformed Y-axis component Vy' is input to the comparators 71, 72, and a trigger fs is input to the repeat counter 73. The angle searching unit 7 searches for, as the detection angle data θd, the rotation angle with which the transformed Y-axis component Vy' crosses a predetermined reference value (predetermined vector), i.e., the rotation angle with which the rotor vector is rotated to a reference vector (predetermined vector), and outputs it.

The comparators 71, 72 receive input of references +α, −α that indicate the reference vector and input of the above-described transformed Y-axis component Vy'. The comparators 71, 72 compare the reference value +α with the transformed Y-axis component Vy' and compare the reference value −α with the transformed Y-axis component Vy' and output a count-up instruction up and a count-down instruction dn to the repeat counter 73.

Specifically, with regard to the comparators 71 and 72, when Y'>+α, the comparator 72 outputs the count-up instruction up and, when Y'<−α, the comparator 71 outputs the count-down instruction dn. When −α<Y'<+α, the comparators 71 and 72 do not output anything.

Each time the trigger fs is input, the repeat counter 73 performs a counting operation on the basis of the count-down instruction dn received from the comparator 71 and the count-up instruction up received from the comparator 72 and outputs the count value as the detection angle data θd of 6 bits, for example.

As a whole, the above-described vector rotation calculation unit 6 and the angle searching unit 7 serve as a rotation-angle searching unit that searches for the rotation angle of the rotor 12 on the basis of the rotor vector (Vx, Vy) that is generated by the vector rotation calculation unit 6 that is a rotor-vector generation unit. Furthermore, the multiplication unit 61 of the vector rotation calculation unit 6 serves as a multiplication unit, and the addition/subtraction amplifiers 63, 64 serve as the rotation-transformation vector generation unit that performs addition and subtraction on multiple results of multiplications performed by the multiplication unit 61 and performs rotation transformation on the rotor vector (Vx, Vy) so as to generate the rotation transformation vector (Vx', Vy'). Furthermore, the angle searching unit 7 serves as a searching unit that rotates the rotation transformation vector (Vx', Vy') that is generated by the rotation-transformation vector generation unit until, especially, the transformed Y-axis component Vy' is located within a predetermined reference vector width, i.e., until the transformed Y-axis component Vy' enters the insensitive region with the angular width ±α and searches for the degree of rotation as the rotation angle of the rotor 12.

Furthermore, as illustrated in FIG. 12, the two-phase pulse generation unit 8 includes a bit acquisition unit 81 and a pulse generation unit 82.

The bit acquisition unit 81 receives input of the detection angle data θd from the angle searching unit 7, acquires the lower 2 bits of the detection angle data θd, and outputs it to the pulse generation unit 82.

The pulse generation unit 82 receives input of the trigger fs and, each time the trigger fs is input, refers to the lower 2 bits of the detection angle data θd, and generates two-phase pulse signals ENCA, ENCB.

Next, an explanation is given of the effect of the present embodiment. The rotation-angle detection device 1 of the present embodiment accurately detects the rotation angle of the rotor at low costs.

Specifically, conventional rotation-angle detection devices perform a calibration operation after the rotation-angle detection device is assembled; therefore, a calibration process is necessary after the rotation-angle detection device is assembled and the costs are increased.

Specifically, the analog Hall signals that are output from the Hall elements 11u and 11v that detect the rotation of the rotor 12 that is a rotator and that are single-ended by the differential unit 2 are ideally output as the ideal analog Hall signals HUideal, HVideal that have a matching amplitude and a phase different of 120 degrees, as illustrated in FIG. 3. In this case, the rotation-angle detection device 1 generates, by using the vector generation unit 4, a vector from the ideal analog Hall signals HUideal, HVideal and outputs the vector component signals Vxpre, Vypre that indicate the components of the generated vector. In the rotation-angle detection device 1, the vector rotation calculation unit 6 generates, from the vector component signals Vxpre, Vypre, the transformed X-axis component Vx' and the transformed Y-axis component Vy' that indicate the components of the rotation transformation vector that is obtained by performing vector rotation on the vector. The rotation-angle detection device 1 uses the angle searching unit 7 to search for the angle between the rotation transformation vector and the vector so as to detect the rotation angle of the rotor 12. Specifically, if the analog Hall signals output from the Hall elements 11u and 11v have an accurately matching amplitude and a phase difference of 90 degrees, the above-described operation is performed so that the rotation angle of the rotor 12 can be accurately detected.

However, as illustrated in FIG. 4, the analog Hall signals that are output from the Hall elements 11u and 11v and that are single-ended by the differential unit 2 are actually the actual analog Hall signals HUreal, HVreal that have different amplitudes and have a phase difference of other than 120 degrees due to deviation of the magnetization of the rotor 12 of the DC brushless motor 10, deviation of the sensitivities of the Hall elements 11u and 11v, and assembly errors of the Hall elements 11u and 11v.

Even if the above-described operation is performed on the actual analog Hall signals HUreal, HVreal that have different amplitudes and phases, it is difficult to accurately detect the rotation angle of the rotor 12.

Therefore, the rotation-angle detection device 1 of the present embodiment uses the first automatic amplitude adjustment unit 3 to match the amplitudes of the actual analog Hall signals HUreal, HVreal output from the differential unit 2 and outputs the first amplitude-adjusted analog Hall signal HUreal' and the actual analog Hall signal HVreal to the vector generation unit 4.

The vector generation unit 4 then performs addition and subtraction operations on the first amplitude-adjusted analog Hall signal HUreal' and the actual analog Hall signal HVreal, which are the sine waves that have a matching amplitude, thereby generating the two vector component signals Vxpre, Vypre that have a phase difference of 90 degrees.

However, as illustrated in FIG. 8, the vector component signal Vxpre and the vector component signal Vypre, which are generated by the vector generation unit 4, sometimes do not have a matching amplitude although they have a phase difference of 90 degrees due to orthogonalization.

Therefore, the rotation-angle detection device 1 uses the second automatic amplitude adjustment unit 5a and the second automatic amplitude adjustment unit 5b of the second automatic amplitude adjustment unit 5 to match the amplitudes of the vector component signal Vxpre and the vector component signal Vypre, which are generated by the vector generation unit 4, so as to input the vector X-axis component Vx and the vector Y-axis component Vy to the vector rotation calculation unit 6.

The vector rotation calculation unit 6 then uses the sine (sin) data, the cosine (cos) data, and the sign adjustment signal Sign, which are received from the rotation matrix coefficient output unit 9, to perform the vector calculation represented by Equation (9) on the rotor vector represented by the vector X-axis component Vx and the vector Y-axis component Vy in accordance with the value of the detection angle data θd so as to perform rotation transformation and output the transformed X-axis component Vx' and the transformed Y-axis component Vy' that indicate the rotation transformation vector.

The vector rotation calculation unit 6 has only the vector X-axis component Vx and the vector Y-axis component Vy that are the values that can be detected during a rotation calculation with respect to the rotor vector and, if a processor that has a higher-level calculation capability is used, the rotation angle of the rotor 12 can be determined by calculating the detection angle θd=arc tan(Y/X); however, the costs of the rotation-angle detection device 1 are increased.

Figure 14:
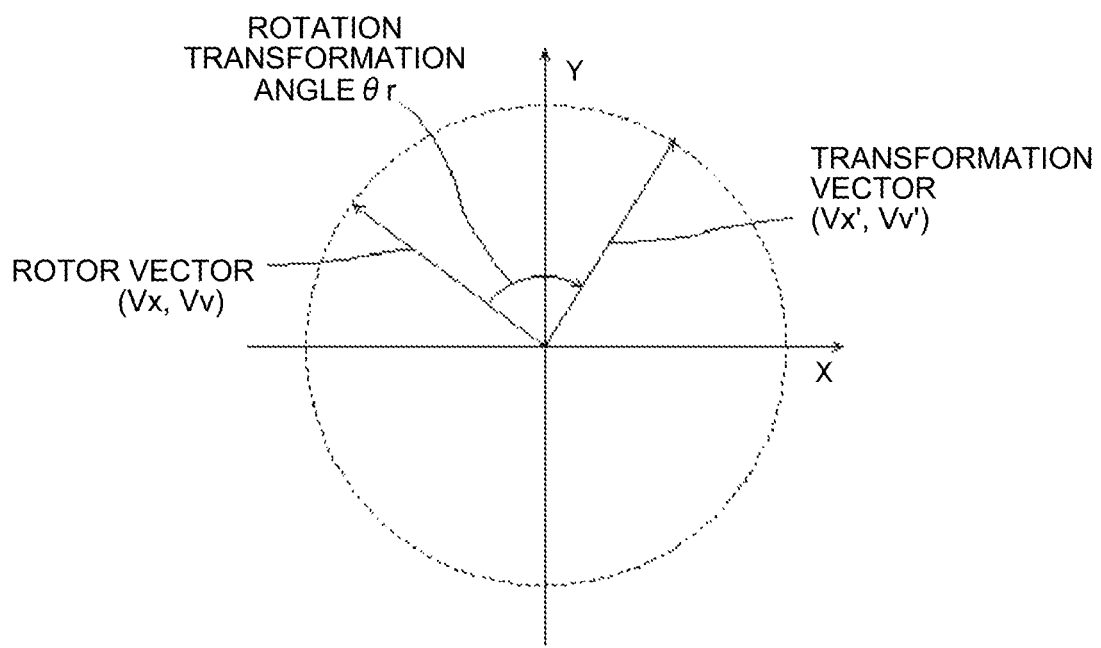
FIG. 14 is a diagram that illustrates the relation between vector rotation and angle detection.

Therefore, the rotation-angle detection device 1 of the present embodiment uses the vector rotation calculation unit 6 to change the value of a rotation transformation angle θr by using the linear transformation equation of rotation that is represented by the above-described Equation (9) until the rotation transformation vector (Vx', Vy') matches a predetermined reference vector (the X axis in the positive direction in the present embodiment), the rotation transformation vector (Vx', Vy') being obtained by rotating the rotor vector (Vx, Vy) at the rotation transformation angle θr, as illustrated in FIG. 14. When the rotation transformation vector (Vx', Vy') matches the reference vector, the vector rotation calculation unit 6 determines that the rotor vector θ=the vector rotation transformation angle θr, detects the rotor angle, and determines that the detected rotor angle is the detection angle data θd. Specifically, if the X axis is the reference vector, it can be determined that there is a match with the X axis that is the reference vector by only determining that the Y-axis component of the rotation transformation vector (Vx', Vy'), i.e., the transformed Y-axis component Y'=0 as the Y-axis component is "0".

However, because of the problem of installation, the above-described sines and cosines that are actually subjected to multiplications during a rotation calculation are discrete data (in the present embodiment, one period is divided into 64); therefore, it is very rare that the transformation vector accurately matches the X axis. Therefore, in the rotation-angle detection device 1 of the present embodiment, the insensitive region of ±α is provided near the X axis and, when the transformation vector is located within the insensitive region of ±α, the angle searching unit 7 determines that it matches the X axis.

Specifically, in the angle searching unit 7, the transformed Y-axis component Vy' is input to the comparators 71, 72 illustrated in FIG. 12, and the trigger fs is input to the repeat counter 73. The angle searching unit 7 searches for, as the detection angle data θd, the rotation angle with which the transformed Y-axis component Vy' crosses a predetermined reference value, i.e., the X axis in the positive direction, that is, the rotation angle with which the rotor vector is rotated to the reference vector and then outputs it. Specifically, as described above, the comparators 71, 72 receive input of the references +α, −α and input of the transformed Y-axis component Vy' and compare the reference value +α with the transformed Y-axis component Vy' and the reference value −α with the transformed Y-axis component Vy'. The comparators 71, 72 output the count-up instruction up and the count-down instruction dn to the repeat counter 73 on the basis of the result of a comparison between the reference value +α and the transformed Y-axis component Vy' and the result of a comparison between the reference value −α and the transformed Y-axis component Vy'. The repeat counter 73 performs a counting operation in accordance with the count-down instruction dn and the count-up instruction up from the comparator 71 and outputs the count value as the detection angle data θd of 6 bits, for example.

Figure 15A:
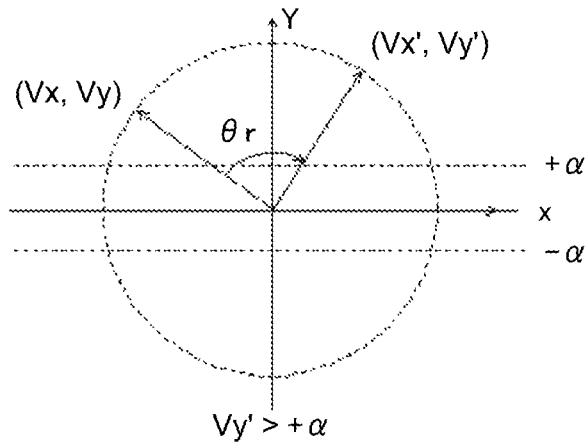
FIGS. 15A to 15C are explanatory diagrams that illustrate matching determination of a transformation vector and a reference vector on the basis of an insensitive region.
Figure 15B:
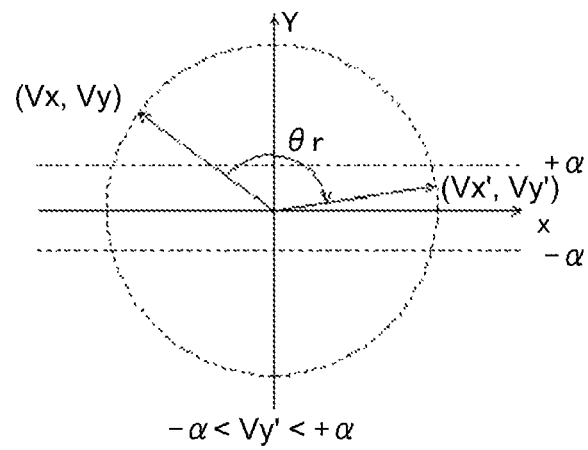
Figure 15C:
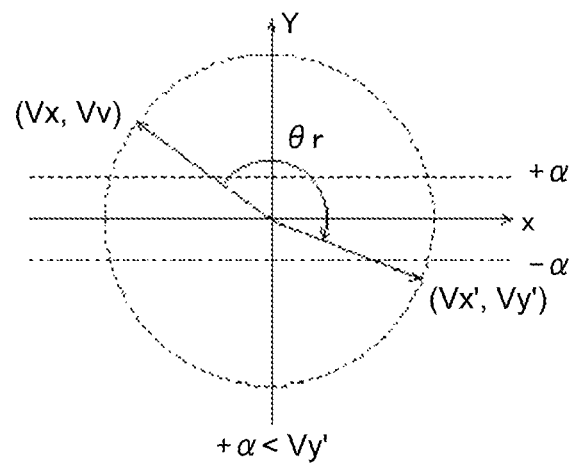
Figure 16:
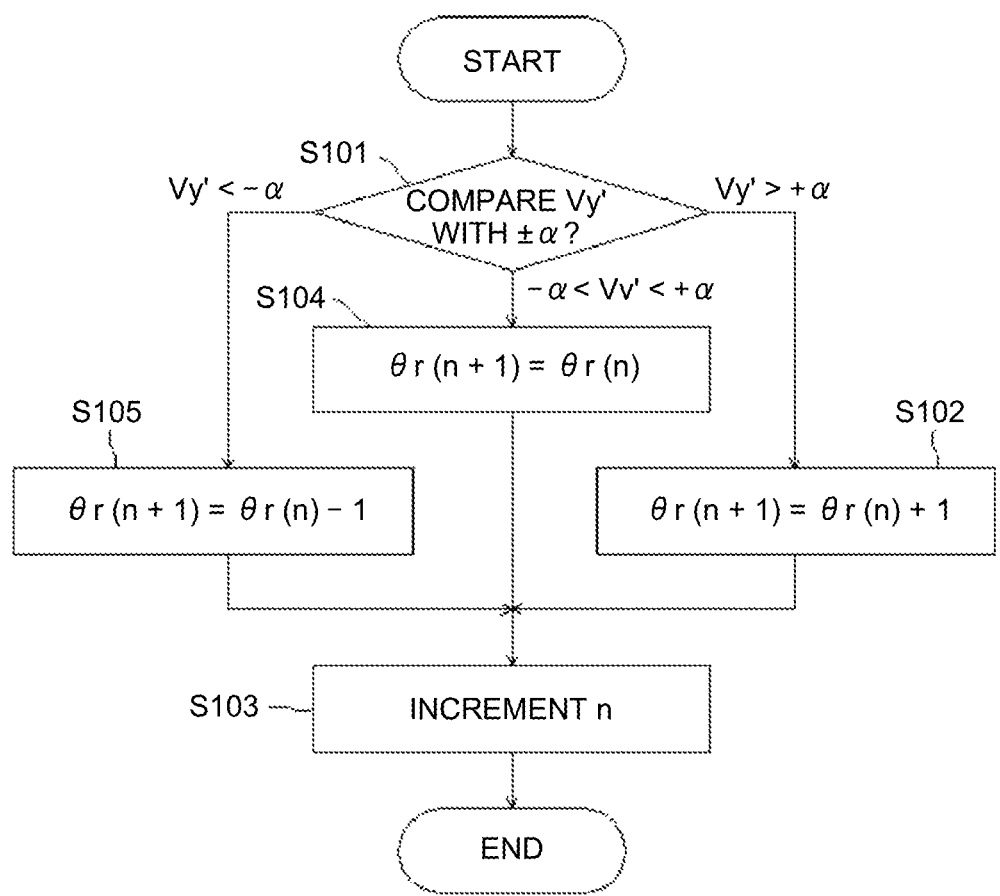
FIG. 16 is a flowchart that illustrates an angle searching operation.

For example, if the rotation transformation angle θr is here changed as illustrated in FIGS. 15A to 15C, the repeat counter 73 performs the counting operation as described below.

(a) When Vy'>+α (in the case of FIG. 15A), the repeat counter 73 receives input of the count-up instruction up from the comparator 72 and counts up the rotation transformation angle θr. (The rotation transformation is conducted in a clockwise direction, and it moves closer to the reference vector, i.e., the X axis in the positive direction.)

(b) When −α<Vy'<+α (in the case of FIG. 15B), the repeat counter 73 does not receive input of the count-up instruction up or the count-down instruction dn but maintains the rotation transformation angle θr. (The rotation transformation is not conducted, and it remains on the reference vector, i.e., the X axis in the positive direction.)

(c) When −α<Vy' (in the case of FIG. 15C), the repeat counter 73 receives input of the count-down instruction do from the comparator 71 and counts down the rotation transformation angle θr. (The rotation transformation is conducted in a counterclockwise direction, and it moves closer to the reference vector, i.e., the X axis in the positive direction.)

Furthermore, the rotation-angle detection device 1 sets the angular width α of the insensitive region to be larger than the rotation angle corresponding to 1 Least Significant Bit (LSB), thereby preventing chattering of the vector in the vicinity of the X axis.

That is, the insensitive region width α is determined and set by using the following Equation (11).

$$\alpha > A * \sin\left(\frac{\theta step}{2}\right) \tag{11}$$

Furthermore, if the above-described second automatic amplitude adjustment unit 5 adjusts the amplitude so as to fall into a certain value, the value of the angular width α of the insensitive region can be previously set; thus, it is not necessary to adjust the value of the angular width α individually.

Furthermore, as illustrated in FIGS. 15A to 15C, the angle searching unit 7 performs the above-described angle searching operation. Specifically, when the angle searching unit 7 receives input of the transformed Y-axis component Vy' from the addition/subtraction amplifier 64 of the vector rotation calculation unit 6, the angle searching unit 7 compares the transformed Y-axis component Vy' with the angular width α (Step S101). As illustrated in FIG. 15A, when the transformed Y-axis component Vy' is larger than the angular width +α

(when Vy'>+α in FIG. 16), the angle searching unit 7 increments (adds) the rotation transformation angle θr(n) by "1" so as to obtain the rotation transformation angle θr(n+1) (θr(n+1)=θr(n)+1) (Step S102). When the angle searching unit 7 obtains the rotation transformation angle θr(n+1), the angle searching unit 7 increments the variable n (n: integer) by "1" (Step S103) and returns to Step S101 in a predetermined period.

When the transformed Y-axis component Vy' is in the range between the angular width +α and the angular width −α at Step S101 (when −α<Vy'<+α in FIG. 16), the angle searching unit 7 does not perform addition or subtraction on the rotation transformation angle θr(n) but determines that the rotation transformation angle θr(n) is the rotation transformation angle θr(n+1) (θr(n+1)=θr(n)) (Step S104). After the angle searching unit 7 determines the rotation transformation angle θr(n+1), the angle searching unit 7 increments the variable n by "1" (Step S103) and returns to Step S101 in a predetermined period.

Furthermore, when the transformed Y-axis component Vy' is smaller than the angular width −α (when Vy'<−α in FIG. 16), the angle searching unit 7 decrements (subtracts) the rotation transformation angle θr(n) by "1" so as to determine the rotation transformation angle θr(n+1) (θr(n+1)=θr(n)−1) (Step S105). After the angle searching unit 7 determines the rotation transformation angle θr(n+1), the angle searching unit 7 increments the variable n by "1" (Step S103) and returns to Step S101 in a predetermined period.

The angle searching unit 7 performs the above-described angle searching operation each time the trigger fs is input as an execution operation signal. Furthermore, the rotation transformation angle θr is a discrete count value and, in the present embodiment, one period is divided into 64 so that θr=0 to 63 [LSB]. That is, θstep=1LSB360/64 [deg].

As the above-described angle searching operation is performed, the rotation transformation vector (Vx', Vy') is always kept in the vicinity of the X axis, and (the detection angle θd)=(the rotation transformation angle θr)≈(the rotor angle θ). Furthermore, it is necessary to set the cycle in which the periodic operation is performed to be adequately faster than the rotating speed of the rotor vector, and it is necessary to provide a period in which the rotor 12 is in a stopped state (strictly, it does not need to be a stopped state but a nearly stopped state) immediately after the power of the image processing apparatus that uses the rotation-angle detection device 1 is turned on in order to search for the angle during the initial rotation of the rotor 12, which will be explained later.

Figure 17:
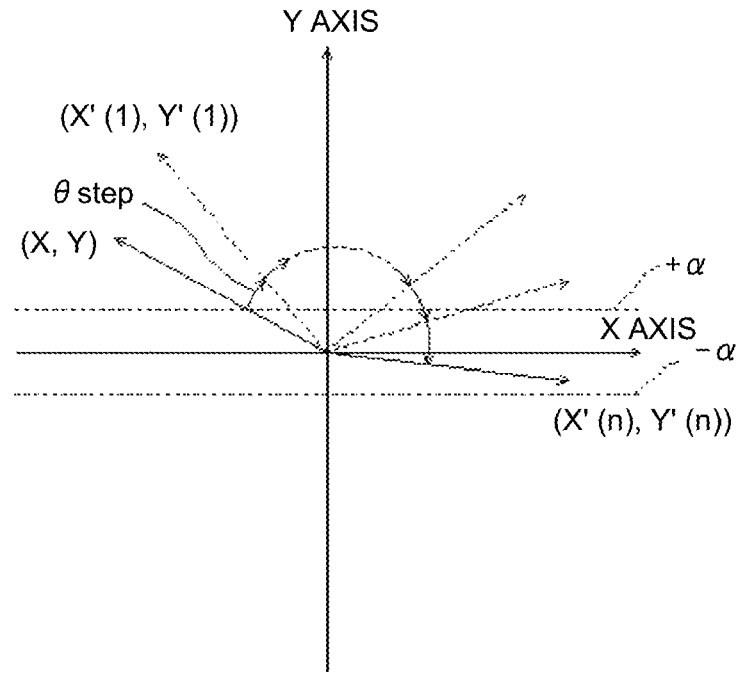
FIG. 17 is an explanatory diagram of angle searching during the initial rotation of a rotor.

Specifically, as illustrated in FIG. 17, in the rotation-angle detection device 1, during the initial rotation of the rotor 12, each time the trigger fs is input, the angle searching unit 7 performs rotation transformation by θstep and, when the rotation transformation vector (Vx', Vy') falls within the insensitive region of the angular width ±α at the n-time trigger fs, the angle searching unit 7 stops the rotation transformation. At this point, the rotation transformation angle θr=n*θstep.

However, during the initial rotation of the rotor 12, by using only the value of the transformed Y-axis component Vy', it is difficult for the angle searching unit 7 to determine whether the rotation transformation vector (Vx', Vy') is located within the insensitive region of the angular width ±α with respect to the reference vector that is the X axis in a positive direction or whether it is located within the insensitive region of the angular width ±α with respect to the X axis (in a negative direction) that turns 180 degrees around.

Then, the angle searching unit 7 compares the transformed X-axis component Vx' with "0" and, if Vx'<0, the angle searching unit 7 determines that the rotation transformation vector (Vx', Vy') is located within the insensitive region of the angular width ±α with respect to the X axis in a negative direction and performs an operation to continuously increase the rotation transformation angle θr, or the like.

Figure 18:
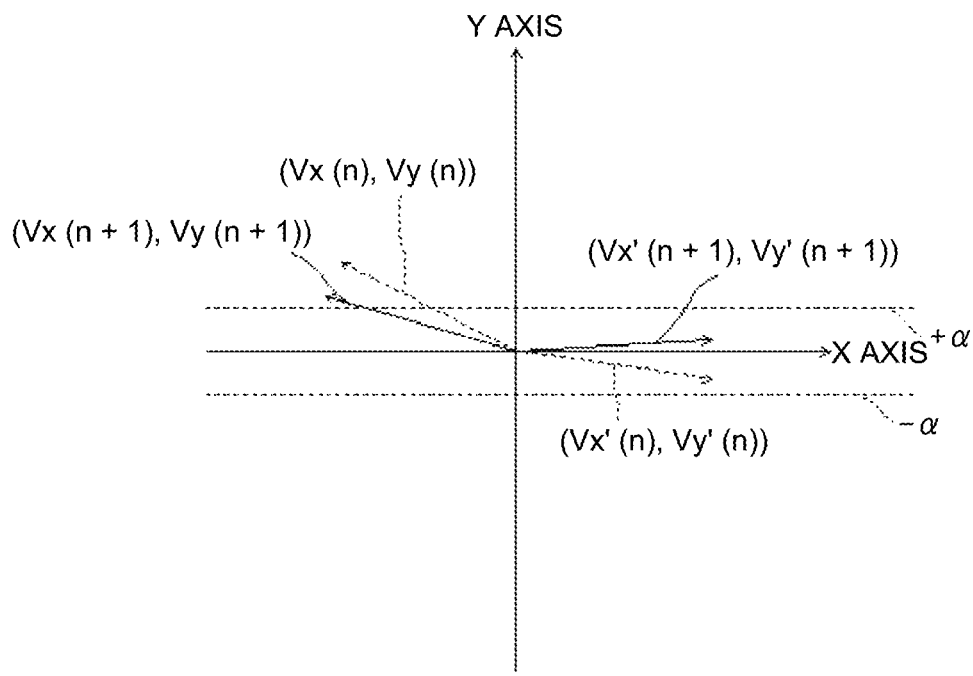
FIG. 18 is an explanatory diagram of a rotor vector and a transformation vector at the time of rotation at the (n+1)-time trigger.
Figure 19:
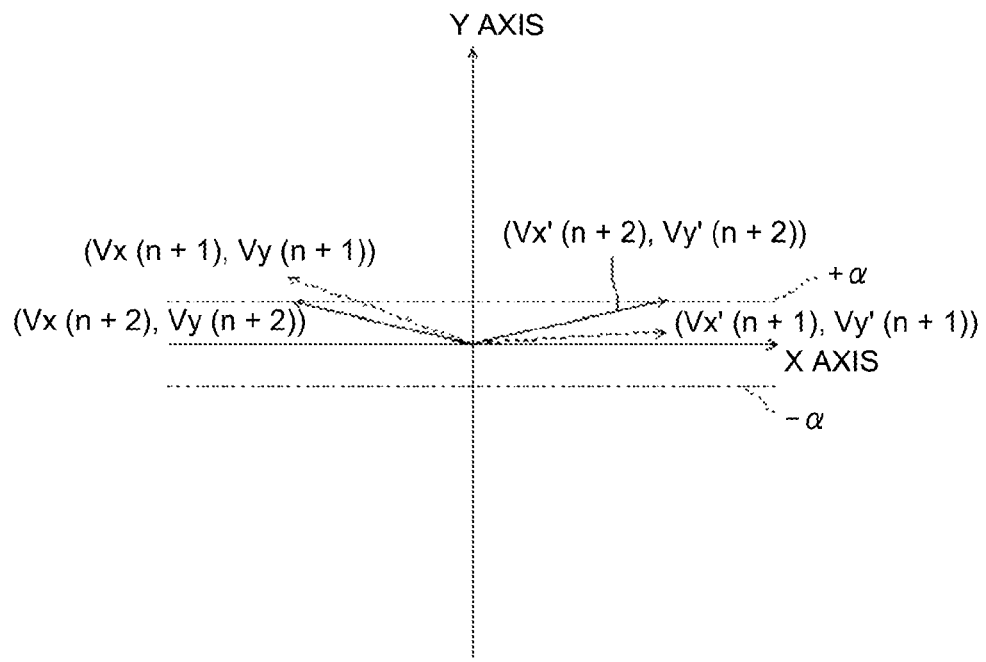
FIG. 19 is an explanatory diagram of a rotor vector and a transformation vector at the time of rotation at the (n+2)-time trigger.
Figure 20:
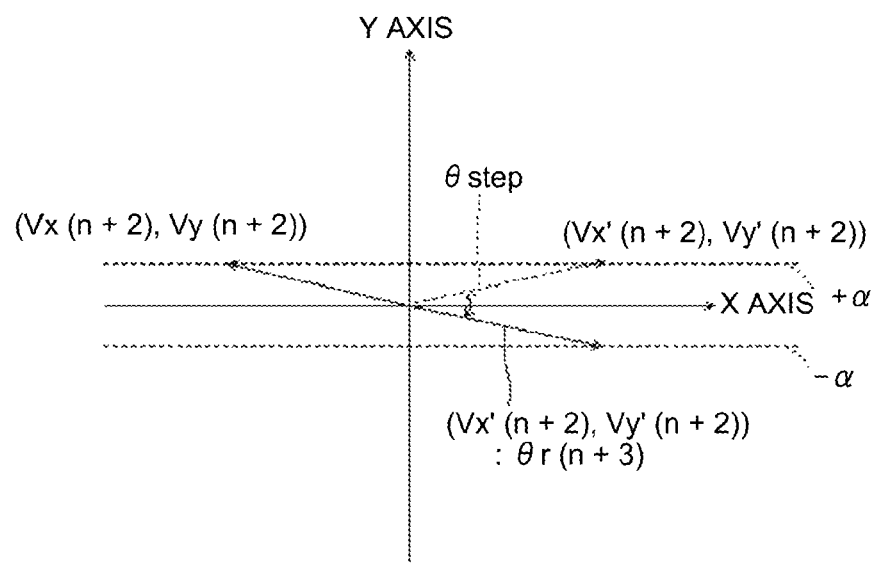
FIG. 20 is an explanatory diagram of a rotation transformation of a rotation transformation vector in accordance with a rotation by a unit rotation angle.

The angle searching unit 7 then performs the angle searching operation as illustrated in FIGS. 18 to 20 during the rotation of the rotor 12.

Specifically, when the (n+1)-time trigger fs is given, the angle searching unit 7 rotates the rotor vector (Vx, Vy) from (Vx(n), Vy(n)) to (Vx(n+1), Vy(n+1)) as indicated by the arrow of the dashed line and the arrow of the solid line in FIG. 18. In accordance with the rotation of the rotor vector (Vx, Vy), the rotation transformation vector (Vx', Vy') is rotated from the rotation transformation vector (Vx'(n), Vy'(n)) that is the rotation position at the n-time trigger fs to the rotation transformation vector (Vx'(n+1), Vy'(n+1)) that is the position at the (n+1)-time trigger fs.

In the case of FIG. 18, with the (n+1)-time trigger, as the transformed Y-axis component Vy' is located within the insensitive region of the angular width ±α (−α<Vy'(n+1)<+α), the angle searching unit 7 does not perform addition or subtraction on the rotation transformation angle θr(n+1) as described above; therefore, the rotation angle is θr(n+2)=θr(n+1).

Furthermore, when the (n+2)-time trigger fs is given, the rotor vector (Vx, Vy) is rotated from (Vx(n+1), Vy(n+1)) to (Vx(n+2), Vy(n+2)) as indicated by the arrow of the dashed line and the arrow of the solid line in FIG. 19. In accordance with the rotation of the rotor vector (Vx, Vy), the rotation transformation vector (Vx', Vy') is rotated from the transformation vector (Vx'(n+1), Vy'(n+1)) that is the rotation position at the (n+1)-time trigger fs to the rotation transformation vector (Vx'(n+2), Vy'(n+2)) that is the position at the (n+2)-time trigger fs.

In the case of FIG. 19, with the (n+2)-time trigger, the transformed Y-axis component Vy' is shifted from the insensitive region of the angular width ±α to the + side (Vy'(n+2)>+α). Therefore, as described above, the angle searching unit 7 adds θstep to the rotation transformation angle θr(n+2) so that the rotation angle is rotated in a clockwise direction and θr(n+3)=θr(n+2)+θstep.

Then, as the rotation transformation angle θr is incremented, the rotation transformation vector (Vx', Vy') is rotated as illustrated in FIG. 20. Specifically, when the value of the rotation transformation angle θr is incremented, the transformation vector (Vx'(n+2), Vy'(n+2)):θr(n+2) is rotated by θstep as illustrated in FIG. 20, and the transformation vector (Vx'(n+2), Vy'(n+2)):θr(n+3) is obtained.

Furthermore, the method of increasing the rotation transformation angle θr is not limited to the method of sequentially increasing it and, for example, 360 degrees is divided into a power-of-two number of sections, and the rotation transformation angle θr is determined by binary search.

Furthermore, as described above, the two-phase pulse generation unit 8 refers to the lower 2 bits of the detection angle data θd that is input from the repeat counter 73 of the angle searching unit 7, generates two-phase pulse signals ENCA, ENCB, and outputs them to the terminal 14 of the DC brushless motor 10. Specifically, as illustrated in FIG. 21, the two-phase pulse generation unit 8 generates, if the lower 2 bits of the detection angle data θd are (0, 0), the two-phase pulse signal ENCA of "H (High)" and ENCB of "L (Low)", if the lower 2 bits of the detection angle data θd are (0, 1), the two-phase pulse signal ENCA of "H" and ENCB of "H", if the lower 2 bits of the detection angle data θd are (1, 0), the two-phase pulse signal ENCA of "L" and ENCB of "H", and if the lower 2 bits of the detection angle data θd are (1, 1), the two-phase pulse signal ENCA of "L" and ENCB of "L".

Therefore, the rotation-angle detection device 1 of the present embodiment is capable of accurately detecting the rotation angle of the rotor 12 at low costs by using the output signals from the existing Hall elements 11u, 11v, and 11w without providing an encoder in the DC brushless motor 10 or without performing an operation to calibrate the output signal after assembly, and it is capable of generating two-phase pulse signals that have a phase difference of a ¼ period that corresponds to a encoder pulse.

Thus, the rotation-angle detection device 1 of the present embodiment includes the first automatic amplitude adjustment unit (amplitude adjustment unit) 3 that performs correction to match the amplitude values of the multiple differential signals (detection signals) HU+/HU−, HV+/HV− output from the multiple Hall elements (rotation detection units) 11u, 11v that change outputs in accordance with the rotation angle of the rotor (rotator) 12 and that are provided such that they output the differential signals HU+/HU−, HV+/HV− that have different phases, thereby outputting the first amplitude-adjusted analog Hall signal HUreal' and the actual analog Hall signal (corrected signal) HVreal; the vector generation unit (vector generation unit) 4 that performs addition and subtraction on two of the multiple first amplitude-adjusted analog Hall signals HUreal' and the actual analog Hall signal (corrected signal) HVreal corrected signal so as to generate the vector component signals Vxpre, Vypre that are the two vector component signals that are perpendicular to each other; the second automatic amplitude adjustment unit (amplitude correction unit) 5 that performs correction to match the amplitudes of the above-described two vector component signals Vxpre, Vypre so as to output the vector X-axis component Vx and the vector Y-axis component Vy that are the corrected vector component signals; and the vector rotation calculation unit 6 and the angle searching unit 7 that serve as the rotation-angle searching unit that searches for the rotation angle of the rotor 12 on the basis of the vector that is represented by the vector X-axis component Vx and the vector Y-axis component Vy that are the two corrected vector component signals and then outputs the detected angle.

Thus, it is possible to detect the rotation angle by providing the first automatic amplitude adjustment unit 3 and the second automatic amplitude adjustment unit 5 in a conventional rotation-angle detection device and performing a simple calculation operation, and it is possible to accurately detect the rotation angle of the rotary shaft at low costs without performing an operation to calibrate the output signals after assembly.

Furthermore, the rotation-angle detection device 1 of the present embodiment is used as a rotation-angle detection unit in an image processing apparatus, such as a multifunction peripheral, that performs various types of image processing by driving a driving mechanism through use of the rotation of the rotor 12, the rotation of the rotor 12 being controlled such that the rotation angle of the rotor 12 is detected by the rotation-angle detection unit.

Therefore, the rotation angle can be detected by performing a simple calculation operation, the rotation angle of the rotary shaft can be accurately detected at low costs without performing an operation to calibrate output signals after assembly, and image processing can be performed appropriately at low costs.

Furthermore, the rotation-angle detection device 1 of the present embodiment performs a rotation-angle detection method that includes an amplitude-adjustment operation step for making correction to match the amplitude values of the multiple differential signals (detection signals) output from the multiple Hall elements (rotation detection units) 11u, 11v that change outputs in accordance with the rotation angle of the rotor (rotator) 12 and that are provided such that they output the differential signals that have different phases, thereby outputting the first amplitude-adjusted analog Hall signal HUreal' and the actual analog Hall signal (corrected signal) HVreal; a vector generation operation step for performing addition and subtraction on two of the multiple first amplitude-adjusted analog Hall signals HUreal' and the actual analog Hall signal (corrected signal) HVreal so as to generate the two vector component signals Vxpre, Vypre that are perpendicular to each other; an amplitude correction operation step for performing correction to match the amplitudes of the two vector component signals Vxpre, Vypre so as to output the vector X-axis component Vx and the vector Y-axis component Vy that are the corrected vector component signals; and a rotation-angle searching operation step for searching for the rotation angle of the rotor 12 on the basis of the vector that is represented by the vector X-axis component Vx and the vector Y-axis component Vy that are the two corrected vector component signals and outputting the detected angle.

Therefore, the rotation angle can be detected by performing a simple calculation operation, the rotation angle of the rotary shaft can be accurately detected at low costs without performing an operation to calibrate output signals after assembly, and image processing can be performed appropriately at low costs.

Furthermore, the rotation-angle detection device 1 of the present embodiment includes the peak hold circuit (base-peak hold unit) 32b that, in the first automatic amplitude adjustment unit (amplitude adjustment unit) 3, determines that one of the actual analog Hall signals HUreal is a reference detection signal, holds the peak value of the reference detection signal, and outputs it as the base peak value; the variable gain amplifier (signal-amplitude adjustment unit) 31 that adjusts the amplitude of the actual analog Hall signal HUreal other than the reference detection signal on the basis of the gain adjustment signal (adjustment value) so as to output the first amplitude-adjusted analog Hall signal (adjusted detection signal) HUreal'; the peak hold circuit (peak hold unit) 32a that holds the peak value of the first amplitude-adjusted analog Hall signal HUreal' and outputs it as the adjusted peak value; and the comparator (adjustment-value determination unit) 33 that compares the reference peak value with the peak value of the first amplitude-adjusted analog Hall signal HUreal' and outputs the difference between them as the adjustment value to the variable gain amplifier 31 that corresponds to the first amplitude-adjusted analog Hall signal HUreal'.

Therefore, it is possible to perform angle detection that uses a rotation calculation of a vector by using a circuit that has a small circuit size in an effective manner. As a result, the rotation angle of the rotary shaft can be accurately detected at low costs without performing an operation to calibrate output signals after assembly.

Furthermore, in the rotation-angle detection device 1 of the present embodiment, the second automatic amplitude adjustment unit (amplitude correction unit) 5 performs correction on the amplitudes of the two vector component signals Vxpre, Vypre in accordance with the predetermined reference-amplitude output control voltage (reference voltage) A and outputs them as the vector X-axis component Vx and the vector component signal (corrected vector component signal) Vy.

Thus, the amplitudes of the vector component signals Vxpre, Vypre can be matched by using a simpler circuit configuration, and the rotation angle of the rotary shaft can be accurately detected at low costs without performing an operation to calibrate output signals after assembly.

Furthermore, in the rotation-angle detection device 1 of the present embodiment, the second automatic amplitude adjustment unit (amplitude correction unit) 5 includes the variable gain amplifiers (signal-amplitude correction units) 51a, 51b that correct the amplitudes of the two vector component signals Vxpre, Vypre on the basis of the output control voltages (correction values) ΔAx, ΔAy so as to output the vector component signals (corrected vector component signals) Vx, Vy; the peak hold circuits (peak hold units) 52a, 52b that hold the peak values of the vector component signals Vx, Vy so as to output them as the corrected peak values; and the comparators (correction-value determination units) 53a, 53b that compare the reference voltage (the reference amplitude value that indicates a reference amplitude) A with the corrected peak values of the vector component signals Vx, Vy and outputs the difference between them, i.e., the output control voltages ΔAx, ΔAy as the gain adjustment signal (correction value) to the variable gain amplifiers 51a, 51b that correspond to the vector component signals Vx, Vy.

Thus, the amplitudes of the vector component signals Vxpre, Vypre can be matched by using a simpler circuit configuration, and the rotation angle of the rotary shaft can be accurately detected at low costs without performing an operation to calibrate output signals after assembly.

Moreover, in the rotation-angle detection device 1 of the present embodiment, the rotation-angle searching unit includes the vector rotation calculation unit (the multiplication unit) 6 that multiplies the vector that is represented by the two vector component signals Vx, Vy output from the second automatic amplitude adjustment unit 5 by the sine (sin) data that is a reference sine wave and the cosine (cos) data; the vector rotation calculation unit (the rotation-transformation vector generation unit) 6 that performs addition and subtraction on the results of multiplications so as to perform a rotation transformation on the vector and generate the rotation transformation vector that is represented by the transformed X-axis component Vx' and the transformed Y-axis component Y'; and the angle searching unit (searching unit) 7 that rotates the rotation transformation vector (Vx', Vy') until it is located within the reference vector width that is represented by the two reference vectors (the X axis ±α) so as to search for the degree of the rotation as the rotation angle of the rotor 12, and outputs the detection angle signal.

Thus, the angle of the rotor 12 can be detected by using a simpler circuit configuration, and the rotation angle of the rotary shaft can be accurately detected at low costs without performing an operation to calibrate output signals after assembly.

Furthermore, in the rotation-angle detection device 1 of the present embodiment, the multiplication unit (multiplication unit) 61 of the vector rotation calculation unit 6 is the resistive ladder type multiplication DAC circuit (R-2R ladder type multiplication digital/analog conversion circuit) 61a, and the rotation-transformation vector generation unit is the addition/subtraction amplifiers (addition/subtraction amplifiers) 63, 64.

Therefore, digital/analog conversion and a multiplication operation can be simultaneously performed, the costs can be reduced, and a calculation operation can be performed with a higher accuracy by obtaining the resistive ladder type multiplication DAC circuit 61a as an IC. As a result, the rotation angle of the rotary shaft can be detected more accurately at lower costs.

Furthermore, the rotation-angle detection device 1 of the present embodiment includes the sign adjustment switch unit (sign switch unit) 62 that switches the sign for the result of multiplication performed by the multiplication unit 61 and outputs it to the vector rotation calculation unit 6.

Thus, 4-quadrant multiplication can be performed by the multiplication unit 61 by using a simple circuit configuration at low costs, and the rotation angle of the rotor can be detected more accurately at lower costs.

Furthermore, in the rotation-angle detection device 1 of the present embodiment, the vector rotation calculation unit 6, i.e., the rotation-transformation vector generation unit, performs a rotation transformation on the vector by the predetermined minimum setting angle so as to generate the transformed X-axis component Vx' and the transformed Y-axis component Vy', and the angle searching unit 7, i.e., the searching unit rotates the transformed X-axis component Vx' and the transformed Y-axis component Vy' with the vector rotation calculation unit 6 until they are located within the reference vector width that is represented by the X axis ±α that are the two reference vectors that have the minimum setting angle, and searches for the degree of the rotation as the rotation angle of the rotor 12.

Thus, chattering during angle detection can be prevented, and the rotation angle of the rotor can be accurately detected in an easy manner.

According to an embodiment, the rotation angle of a rotary shaft can be accurately detected at low costs without performing an operation to calibrate output signals after assembly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotation-angle detection device comprising:
    an amplitude adjustment unit that performs correction to match amplitude values of multiple detection signals output from multiple rotation detection units and that outputs corrected signals, the rotation detection units changing outputs in accordance with a rotation angle of a rotor and being provided such that the rotation detection units output the detection signals that have different phases;
    a vector generation unit that performs addition and subtraction on two signals out of the corrected signals so as to generate two vector component signals that are perpendicular to each other;
    an amplitude correction unit that performs correction to match amplitudes of the two vector component signals so as to output corrected vector component signals; and
    a rotation-angle searching unit that searches for the rotation angle of the rotor on basis of a vector that is represented by the two corrected vector component signals and that outputs a detection angle.

2. The rotation-angle detection device according to claim 1, wherein the amplitude adjustment unit includes
    a base-peak hold unit that holds a peak value of a reference detection signal and outputs a base peak value, the reference detection signal being one of the detection signals;
    a signal-amplitude adjustment unit that adjusts amplitude of the detection signals other than the reference detection signal on basis of an adjustment value and outputs an adjusted detection signal;
    a peak hold unit that holds a peak value of the adjusted detection signal and outputs it as an adjusted peak value; and an adjustment-value determination unit that compares the base peak value with the adjusted peak value of the adjusted detection signal and outputs a difference therebetween as the adjustment value to the signal-amplitude adjustment unit that corresponds to the adjusted detection signal.

3. The rotation-angle detection device according to claim 1, wherein the amplitude correction unit performs correction to match the amplitudes of the two vector component signals to a predetermined reference amplitude and outputs the corrected vector component signals.

4. The rotation-angle detection device according to claim 3, wherein the amplitude correction unit includes
signal-amplitude correction units that correct the amplitudes of the two vector component signals on basis of respective correction values and output corrected vector component signals;
peak hold units that hold peak values of the respective corrected vector component signals and outputs corrected peak values; and
correction-value determination units that compare a reference amplitude value that indicates the reference amplitude with the corrected peak values of the respective corrected vector component signals and output differences therebetween as the correction values to the signal-amplitude correction units that correspond to the corrected vector component signals.

5. The rotation-angle detection device according to claim 1, wherein the rotation-angle searching unit includes
a multiplication unit that multiplies a reference sine wave by a vector that is represented by the two corrected vector component signals that are output from the amplitude correction unit;
a rotation-transformation vector generation unit that performs addition and subtraction on a plurality of multiplication results obtained by the multiplication unit so as to perform rotation transformation on the vector and generate a rotation transformation vector; and
a searching unit that rotates the rotation transformation vector until the rotation transformation vector is located within a reference vector width that is represented by two reference vectors so as to search for a degree of that rotation as a rotation angle of the rotor, and outputs detection angle signal.

6. The rotation-angle detection device according to claim 5, wherein
the multiplication unit is an R-2R ladder type multiplication digital/analog conversion circuit, and
the rotation-transformation vector generation unit is an addition/subtraction amplifier.

7. The rotation-angle detection device according to claim 5, wherein the rotation-angle detection device further includes a sign switch unit that switches signs for the multiplication results obtained by the multiplication unit and outputs the signs to the rotation-transformation vector generation unit.

8. The rotation-angle detection device according to claim 5, wherein
the rotation-transformation vector generation unit performs rotation transformation on the vector by a predetermined minimum setting angle so as to generate the rotation transformation vector, and
the searching unit rotates the rotation transformation vector with the rotation-transformation vector generation unit until the rotation transformation vector is located within a reference vector width that is represented by the two reference vectors that have the minimum setting angle, and searches for a degree of that rotation as the rotation angle of the rotor.

9. An image processing apparatus that detects a rotation angle of a rotor with a rotation-angle detection unit so as to control the rotation of the rotor and performs various types of image processing by driving a driving mechanism through use of rotation of the rotor, wherein
the rotation-angle detection unit is the rotation-angle detection device according to claim 1.

10. A rotation-angle detection method comprising:
performing correction to match amplitude values of multiple detection signals output from multiple rotation detection units and outputting corrected signals, the rotation detection units changing outputs in accordance with a rotation angle of a rotor and being provided such that the rotation detection units output the detection signals that have different phases;
performing addition and subtraction on two signals out of the corrected signals so as to generate two vector component signals that are perpendicular to each other;
performing correction to match amplitudes of the two vector component signals so as to output corrected vector component signals; and
searching for the rotation angle of the rotor on basis of a vector that is represented by the two corrected vector component signals and outputting a detection angle.

* * * * *